United States Patent
Morgan et al.

(10) Patent No.: US 6,949,595 B2
(45) Date of Patent: Sep. 27, 2005

(54) MULTI-LAYER GOLF BALL WITH TRANSLUCENT COVER

(75) Inventors: William E. Morgan, Barrington, RI (US); Kevin M. Harris, New Bedford, MA (US); Shawn Ricci, New Bedford, MA (US)

(73) Assignee: Acushnet Company, Fairhaven, MA (US)

(*) Notice: Subject to any disclaimer, the term of this patent is extended or adjusted under 35 U.S.C. 154(b) by 217 days.

(21) Appl. No.: 10/384,422

(22) Filed: Mar. 7, 2003

(65) Prior Publication Data

US 2004/0176531 A1 Sep. 9, 2004

(51) Int. Cl.$^7$ .............................................. A63B 37/12
(52) U.S. Cl. ........................ 524/102; 528/61; 528/68; 473/374
(58) Field of Search .......................... 524/102; 528/61, 528/68; 473/374

(56) References Cited

U.S. PATENT DOCUMENTS

| | | | |
|---|---|---|---|
| 2,809,954 A | 10/1957 | Kazenas | 260/45.2 |
| 2,851,424 A | 9/1958 | Switzer et al. | 252/301.2 |
| 2,938,873 A | 5/1960 | Kazenas | 252/301.2 |
| 3,253,146 A | 5/1966 | de Vries | 250/71 |
| 3,412,036 A | 11/1968 | McIntosh | 252/301.2 |
| 3,989,568 A | 11/1976 | Isaac | 156/182 |
| 4,123,061 A | 10/1978 | Dusbiber | 273/220 |
| 4,128,600 A | 12/1978 | Skinner et al. | 260/859 |
| 4,342,793 A | 8/1982 | Skinner et al. | 427/44 |
| 4,798,386 A | 1/1989 | Berard | 273/235 |
| 4,921,759 A | 5/1990 | Orain et al. | 428/424 |
| 4,950,696 A | 8/1990 | Palazotto et al. | 522/25 |
| 4,985,340 A | 1/1991 | Palazzotto et al. | 430/270 |
| 4,998,734 A | 3/1991 | Meyer | 273/235 |
| 5,018,742 A * | 5/1991 | Isaac et al. | 473/378 |
| 5,147,900 A | 9/1992 | Palazzotto et al. | 522/25 |
| 5,256,170 A | 10/1993 | Harmer et al. | 51/293 |
| 5,326,621 A | 7/1994 | Palazzotto et al. | 428/195 |
| 5,334,673 A | 8/1994 | Wu | 273/235 |
| 5,360,462 A | 11/1994 | Harmer et al. | 51/295 |
| 5,376,428 A | 12/1994 | Palazzotto et al. | 428/143 |
| 5,427,378 A | 6/1995 | Murphy | 273/235 |
| 5,484,870 A | 1/1996 | Wu | 528/28 |
| 5,494,291 A | 2/1996 | Kennedy | 273/235 |
| 5,605,761 A | 2/1997 | Burns et al. | 428/412 |
| 5,672,643 A | 9/1997 | Burns et al. | 524/90 |
| 5,674,622 A | 10/1997 | Burns et al. | 428/412 |
| 5,692,974 A | 12/1997 | Wu et al. | 473/377 |
| 5,783,293 A | 7/1998 | Lammi | 428/212 |
| 5,800,286 A | 9/1998 | Kakiuchi et al. | 473/365 |
| 5,820,488 A | 10/1998 | Sullivan et al. | 473/374 |
| 5,823,890 A | 10/1998 | Maruko et al. | 473/354 |
| 5,823,891 A | 10/1998 | Winskowicz | 473/378 |
| 5,840,788 A | 11/1998 | Lutz et al. | 524/95 |
| 5,902,191 A * | 5/1999 | Masutani et al. | 473/365 |
| 5,929,189 A | 7/1999 | Ichikawa et al. | 528/76 |
| 5,938,544 A | 8/1999 | Winskowicz | 473/378 |
| 5,989,135 A | 11/1999 | Welch | 473/353 |
| 5,993,968 A | 11/1999 | Umezawa et al. | 428/407 |
| 6,251,991 B1 | 6/2001 | Takesue et al. | 525/66 |
| 6,277,037 B1 | 8/2001 | Winskowicz et al. | 473/378 |
| 6,358,160 B1 | 3/2002 | Winskowicz | 473/378 |
| 6,558,277 B1 * | 5/2003 | Ohira et al. | 473/378 |
| 2002/0086743 A1 * | 7/2002 | Bulpett et al. | 473/371 |

FOREIGN PATENT DOCUMENTS

JP 2001-087423 * 4/2001

* cited by examiner

*Primary Examiner*—David J. Buttner
(74) *Attorney, Agent, or Firm*—Kristin D. Wheeler

(57) ABSTRACT

A golf ball including a center, a translucent cover, and, optionally, at least one intermediate layer disposed between the center and the cover. The cover is preferably formed from a polyurethane composition or a reaction product of isocynate. The cover is further comprised at least one color stabilizer and/or an optical enhancer. Preferably, the intermediate layer contributes to the overall appearance of the ball and can contain pigment and/or optical brighteners.

24 Claims, 1 Drawing Sheet

MULTI-LAYER GOLF BALL WITH TRANSLUCENT COVER

FIELD OF THE INVENTION

The invention relates generally to golf balls and, in one embodiment, to golf ball covers wherein the outer layer is translucent.

BACKGROUND OF THE INVENTION

Golf balls, whether of solid or wound construction, generally include a core and a cover. It is known in the art to modify the properties of a conventional solid ball by altering the typical single layer core and single cover layer construction to provide a ball having at least one mantle layer disposed between the cover and the core. The core may be solid or liquid-filled, and may be formed of a single layer or one or more layers. Covers, in addition to cores, may also be formed of one or more layers. These multi-layer cores and covers are sometimes known as "dual core" and "dual cover" golf balls, respectively. Additionally, many golf balls contain one or more intermediate layers that can be of solid construction or, in many cases, be formed of a tensioned elastomeric winding, which are referred to as wound balls. The difference in play characteristics resulting from these different types of constructions can be quite significant. The playing characteristics of multi-layer balls, such as spin and compression, can be tailored by varying the properties of one or more of these intermediate and/or cover layers.

Manufacturers generally provide the golf ball with a durable cover material, such as an ionomer resin, or a softer cover material, such as polyurethane. Chemically, ionomer resins are a copolymer of an olefin and an $\alpha,\beta$-ethylenically-unsaturated carboxylic acid having 10–90% of the carboxylic acid groups neutralized by a metal ion and are distinguished by the type of metal ion, the amount of acid, and the degree of neutralization. Commercially available ionomer resins include copolymers of ethylene and methacrylic or acrylic acid neutralized with metal salts. Examples include SURLYN® from E.I. DuPont de Nemours and Co. of Wilmington, Del. and IOTEK® from Exxon Corporation of Houston, Tex.

Surrounding the core with an ionomeric cover material provides a ball that is virtually indestructible by golfers. The core/cover combination permits golfers to impart a high initial velocity to the ball that results in improved distance.

Polyurethanes are used in a wide variety of applications including adhesives, sealants, coatings, fibers, injection molding components, thermoplastic parts, elastomers, and both rigid and flexible foams. Polyurethane can be produced by the product of a reaction between a polyurethane prepolymer and a curing agent. The polyurethane prepolymer is generally a product formed by a reaction between a polyol and a diisocyanate. The curing agents used previously are typically diamines or glycols. A catalyst is often employed to promote the reaction between the curing agent and the polyurethane prepolymer.

Since about 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a fast-reacting diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol.

Additionally, U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

The color instability caused by both thermo-oxidative degradation and photodegradation typically results in a "yellowing" or "browning" of the polyurethane layer, an undesirable characteristic for urethane compositions are to be used in the covers of golf balls, which are generally white.

U.S. Pat. No. 5,692,974 to Wu et al. discloses golf balls which have covers and cores and which incorporate urethane ionomers. The polyurethane golf ball cover has improved resiliency and initial velocity through the addition of an alkylating agent such as t-butyl chloride to induce ionic interactions in the polyurethane and thereby produce cationic type ionomers. UV stabilizers, antioxidants, and light stabilizers may be added to the cover composition.

U.S. Pat. No. 5,484,870 to Wu discloses a golf ball cover comprised of a polyurea. Polyureas are formed from reacting a diisocyanate with an amine.

U.S. Pat. No. 5,823,890 to Maruko et al., discloses a golf ball formed of a cover of an inner and outer cover layer compression molded over a core. The inner and outer cover layers should have a color difference $\Delta E$ in Lab color space of up to 3.

U.S. Pat. No. 5,840,788 to Lutz et al. discloses a UV light resistant, visibly transparent, urethane golf ball topcoat composition for use with UV curable inks. The topcoat includes an optical brightener that absorbs at least some UV light at wavelengths greater than about 350 nm, and emits visible light, and a stabilizer package. The light stabilizer package includes at least one UV light absorber and, optionally, at least one light stabilizer, such as a HALS.

U.S. Pat. No. 5,494,291 to Kennedy discloses a golf ball having a fluorescent cover and a UV light blocking, visibly transparent topcoat. The cover contains a fluorescent material that absorbs at least some UV light at wavelengths greater than 320 nm and emits visible light.

Colored golf balls have been produced for many years. In the 1960s Spalding produced a yellow range ball with a blended cover that included polyurethane.

U.S. Pat. No. 4,798,386, to Berard, makes reference to white cores and clear covers and even locating decoration on the core to be visible through the clear cover. The Berard concept requires a core which has a satisfactory hue to achieve the desired finished ball coloration. A polybutadiene rubber core of such a color has never been produced and as such, clear cover 2-pc ball have had limited market success.

U.S. Pat. No. 4,998,734 to Meyer, describes a golf ball with a core, a clear cover and "layer interdisposed therebetween." However, the intermediate layer described is a thin layer of paper or plastic material whose purpose is only to bear textural, alphanumeric or graphical indicia. Meyer teaches that the layer should be sufficiently thin to permit substantial transference of impact forces from the cover to the core without substantially reducing the force.

The Pro Keds "Crystal $\pi$" golf ball appeared in the Japanese market. It had a white core bearing the ball markings and a clear Surlyn cover. This ball had a very thick clear cover (>0.065") and the surface dimple coverage was very low.

In the early 1990s, Acushnet made clear Surlyn cover, two-piece Pinnacle Practice balls. The covers were 0.050" thick.

A prototype Wilson Surlyn covered two-piece ball, "Quantum", of a design similar to the Pro Keds ball was found in the US in the late 1990s. The cover was greater than 0.065 inches thick.

U.S. Pat. No. 5,442,680, Proudfit is directed to a golf ball with a clear ionomer cover. The patent requires a blend of ionomers with different cations.

In the early 1990s a solid one-piece urethane golf ball having a hole for the insertion of a chemi-luminescent tube was sold as a "Night Golf" ball. It was relatively translucent to create the glow, but it was far from having the performance characteristics of standard golf balls.

Two-piece balls have been sold under the tradename "Glow Owl" which utilize a white core and a cover with glow in the dark materials. This ball is believed to embody the technology described in U.S. Pat. No. 5,989,135 to Welch, which describes a "partially translucent" cover.

At the January 2001 PGA Show, Wilson displayed samples of "iWound" golf balls with clear covers. They were not balls for actual play but mock-ups used to display their new "lattice wound" technology. The lattice (discontinuous inner cover layer) was Hytrel and the Surlyn outer cover layer was clear. Both the Hytrel lattice and red core were visible through the clear cover. No markings were on the core or lattice.

To date, it has been difficult for manufacturers to properly attain the desired long-term appearance of polyurethane compositions used in golf ball covers without adversely affecting golf ball performance. Many golf balls have at least one layer of "paint" covering the cover material. This long-felt problem in the golf ball art has now led the Applicants to seek a desirable formulation of a polyurethane composition suitable for use in golf ball covers that exhibits improved properties and allows for substantially different looking golf balls

SUMMARY OF THE INVENTION

The present invention is directed to a golf ball including a center, a cover and at least one intermediate layer disposed between the center and the cover, wherein the cover is formed from a translucent composition. Preferably the cover is formed of at least one polyol or amine at least one polyisocyanate and at least one curing agent and the intermediate layer contributes the color of the ball.

A preferred embodiment of the present invention is a golf ball comprising a center, a cover, and at least one intermediate layer disposed between the center and the cover. The cover is formed from a substantially translucent composition comprising polyisocyanate and the intermediate layer is comprised of pigment. Preferably, the cover is substantially optically clear and the intermediate layer contributes to the color of the ball. Generally, the cover has a thickness of at least 0.01 inch, has at least one of a material hardness of less than about 70 Shore D, a flexural modulus of less than about 75,000 psi, and a dimple coverage of greater than about 65% and the ball has an ATTI compression of less than about 120.

In one embodiment, the cover includes an outer surface with indicia. In another embodiment, the intermediate layer includes an outer surface with indicia. In yet another embodiment, there is indicia on both layers.

Preferably, the cover further comprises color stabilizer comprising a UV absorber or a light stabilizer. The UV absorber comprises triazines, benzoxazinones, benzotriazoles, benzophenones, benzoates, formamidines, cinnamates/propenoates, aromatic propanediones, benzimidazoles, cycloaliphatic ketones, formanilides, cyanoacrylates, benzopyranones, and mixtures thereof. The UV absorber is preferably present in an amount between about 0.1 weight percent and about 6.0 weight percent and more preferably, in an amount between about 1.0 weight % to about 5.0 weight %. Most preferably, the UV absorber is present in an amount between about 3.0 weight % and about 5.0 weight %.

Preferably light stabilizers include bis-(substituted) heteropolycyclicdione; N,N'-1,6-hexanediylbis {N-(2,2,6,6-tetramethyl-4-piperidinyl)-formamide}; dimethyl succinate polymer with 4-hydroxy-2,2,6,6-tetra-methyl-1-piperidine ethanol; bis-(1,2,2,6,6-pentamethyl-4-piperidinyl)sebacate; hindered amine; 3-dodecyl-1-(2,2,6,6-tetramethyl-4-piperidyl-pyrrolidin-2,5-dione; poly-methylpropyl-3-oxy-[4 (2,2,6,6-tetramethyl)piperidinyl]siloxane; bis-(1,2,2,6,6-pentamethyl-4-piperidinyl)-sebacate; bis-(2,2,6,6-tetramethyl-4-piperidinyl)-sebacate; bis-(1-octyloxy-2,2,6,6,tetramethyl-4-piperidinyl) sebacate; n-butyl-(3,5-di-t-butyl-4-hydroxybenzyl)bis-(1,2,2,6-pentamethyl-4-piperidinyl) malonate; bis-(2,2,6,6-tetramethyl-4-piperidinyl) sebacate; compounds containing at least one of the following structure:

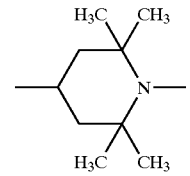

and mixtures thereof. The light stabilizer is present in an amount between about 0.01 weight % and about 3 weight %. Preferably, the light stabilizer is present in an amount between about 0.05 weight % and about 2 weight % and most preferably, in an amount between about 0.1 weight % and about 1.0 weight %.

Preferably the polyisocyanate in the cover comprises 4,4'-diphenylmethane diisocyanate; polymeric 4,4'-diphenylmethane diisocyanate; carbodiimide-modified liquid 4,4'-diphenyl methane diisocyanate; 4,4'-dicyclohexylmethane diisocyanate; p-phenylene diisocyanate; toluene diisocyanate; 3,3'-dimethyl-4,4'-biphenylene diisocyanate; isophoronediisocyanate; hexamethylene diisocyanate; naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of methyl cyclohexylene diisocyanate; isocyanurate of 2,4,4-trimethyl-1,6-hexane diisocyanate; tetracene diisocyanate; napthalene diisocyanate; anthracene diisocyanate; and mixtures thereof. The cover is further comprised of a curing agent of a polyamine or a polyol. In a preferred embodiment, the translucent composition is comprised of a prepolymer comprising the polyisocynate and a polyol or an amine.

In another preferred embodiment, the invention includes a golf ball comprising a core, a cover and at least on intermediate layer wherein the intermediate layer is comprised of pigment which contributes to the color of the ball and the cover is at least partially transparent with an optical enhancer. Preferably, the optical enhancer is a florescent dye, optical brightner or an optical active chemical additive. Preferably, the cover is between about 0.01 and 0.05 inches thick and is comprised of a polyisocynate. The intermediate layer is preferably comprised of a thermoplastic elastomer of at least one color.

In a preferable embodiment, the cover is substantially optically clear and the intermediate layer is further comprised of an optical brightener. For a preferred visual effect, the cover has an outer surface that includes a plurality of dimples covering at least 80% of the outer surface.

In a golf ball comprised of a ball precursor and a substantially translucent cover having greater than 80% of an outer surface thereof covered by dimples, on embodiment has between about 300 and 360 dimples. Another embodiment has between about 360 and 400 dimples and yet another embodiment has between about 400–490 dimples.

Preferably, the translucent cover is less than about 0.05 inch thick and even between about 0.01 and 0.04 inch. The intermediate layer has a preferable thickness of about 0.02 to 0.1 inch.

Another embodiment of the present inventor is a golf ball comprised of a ball precursor and a substantially translucent cover comprising an optical brightener comprised of stilbene derivatives; 4,4'bis-(2-benzoxazolyl)stilbene; styryl derivatives of benzene and biphenyl; bis-(benzazol-2-yl) dirivatives; thiophene benzoxazole; coumarins; 7-(2h-naphthol (1,2-d)-triazol-2-yl)-3-phenyl-coumarin; carbostyrils; naphthalimides; derivatives of dibenzothiophene-5,5-dioxide; pyrene derivatives; pyridotriazoles; derivatives of 4,4'-diamino stilbene-2,2'-disulfonic acid; 4-methyl-7-diethylamino coumarin; 2,5-bis(5-tert-butyl)-2-benzoxazolyl)thiophene; triazinol benzenedisulfonic acid derivatives; 2,2'-(1,2-ethenediylbis((3-sulfo-4,1-phenylene) imino(6-(diethylamino)-1,3,5-triazine-4,2-diyl)imino))bis-1,4-benzenedisulfonic acid hexasodium salt; 2,5-thiophenediylbis(5-tert-butyl-1,3-benzooxazole; and mixtures thereof. The cover preferably has greater than 80% of an outer surface thereof covered by dimples.

Preferably, the dimples on the golf ball according to the present invention are substantially round. However, other shaped dimples are contemplated.

A preferred embodiment of the invention is a golf ball comprised of a ball precursor and a substantially translucent cover comprising polyurea and having greater than 80% of an outer surface thereof covered by dimples.

In a golf ball comprising a cover, a core and an intermediate layer, where in the cover and the intermediate layer comprise an optically active component effecting the appearance of the ball, the cover is preferably comprised of a florescent dye. The cover can also be comprised of an optical brightener. In another embodiment, the intermediate layer is comprised of an optical brightener. The golf ball can also have indicia on an outer surface of the cover or on an outer surface of the intermediate layer.

In another embodiment of the present invention, the intermediate layer is comprised of more than one color. For example, two different color hemispheres can be molded to form different color halves. In another embodiment, two different colors can be placed in a co-injection machine to co-inject a multi-color intermediate layer.

DESCRIPTION OF THE PREFERRED EMBODIMENTS

Figure 1:
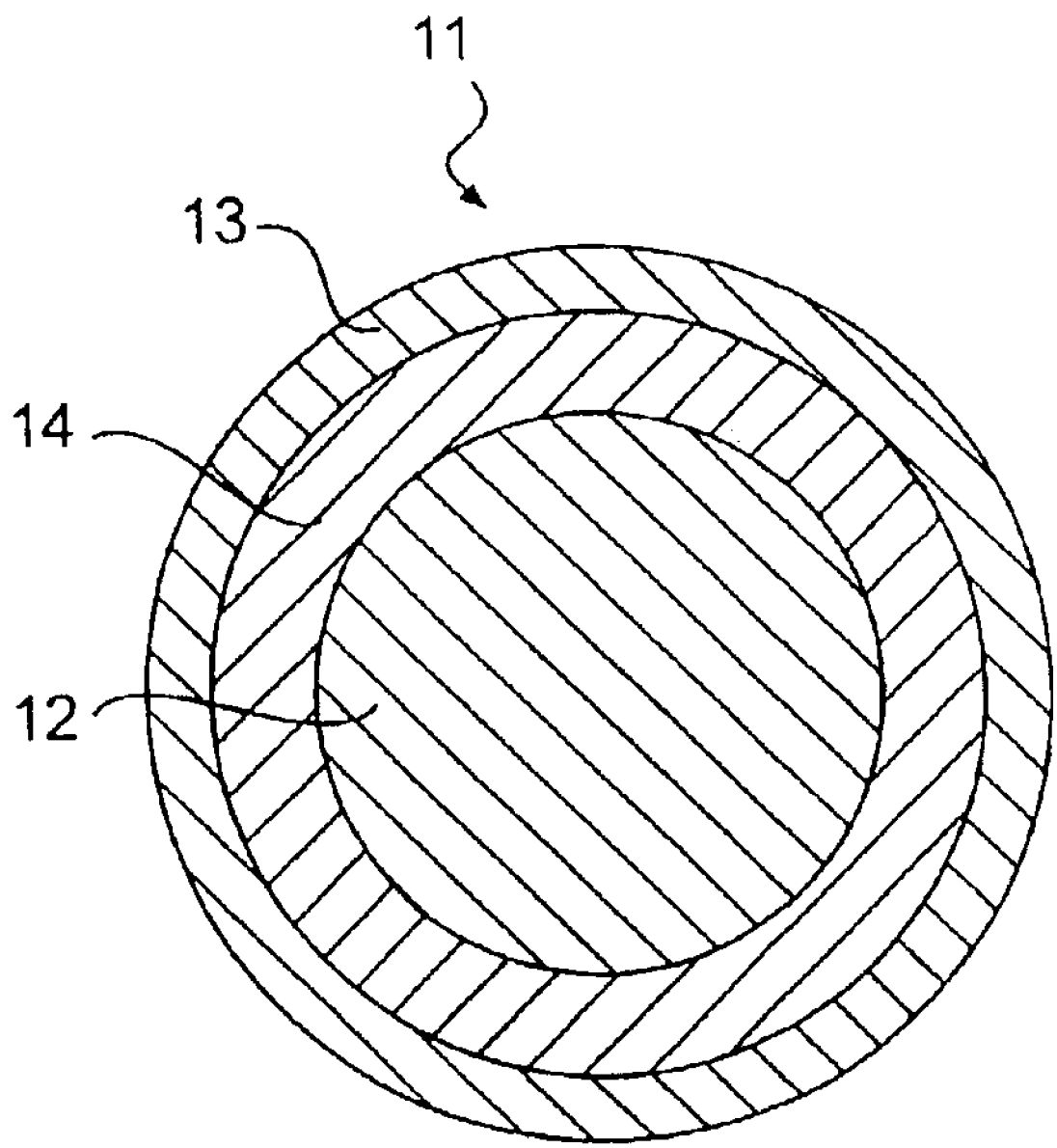
FIG. 1 is a cross-sectional view of a golf ball according to the present invention.

This invention is primarily directed to golf balls having a core of one or more layers, at least one intermediate layer, and a cover. Preferably, the golf ball cover is formed of a substantially translucent material and the intermediate layer contributes to the overall color of the golf ball. This unique construction can provide a number of significantly different looking balls that have never been made before. In one preferred embodiment, the cover is the reaction product of a prepolymer including at least one polyisocyanate and at least one polyol or polyamine with at least one curing agent. The cover may also include a color stabilizer package as set forth in detail below.

Referring to FIG. 1, the golf ball 11 of the present invention is comprised generally of a core 12, a cover 13 and an intermediate layer 14 therebetween. The core 12 is preferably solid and comprised of one or more layers as set forth in detail below. The cover 13, discussed next, is translucent such that the intermediate layer can be seen. The intermediate layer 14, preferably includes pigment such that it can add to the overall appearance of the ball. Preferably, the intermediate layer 14 is a thermoplastic layer that pigment can be added to easily.

Preferably, the cover is comprised of clear, unpigmented urethane or urea that can be cast, injection molded, compression molded or reaction injection molded over a colored golf ball precursor. For example, the outer cover is clear and the adjacent intermediate layer is colored. Any color(s) may be used to create golf balls according to the present invention. In Japan, and to a lesser extent in the US, various pastel shades of blue, green and others have appeared on the cover of two-piece balls. These colors could be obtained from using the pigment in an inner cover layer while the outer cover includes either a fluorescent dye or optically active chemical additive to further enhance the color.

A preferred embodiment includes a clear outer layer, one as close to optically transparent as possible, but in other embodiments a merely translucent layer may be preferred. The use of a lightly colored or tinted outer layer makes possible color depth characteristics not previously possible. Similarly, the intermediate layer and cover layers can contain reflective or optically active particulates such as described by Murphy in U.S. Pat. No. 5,427,378 which is incorporated by reference herein. In particular, these materials could be used in the intermediate layer or inner cover of the present invention and covered with a clear outer layer. Pearlescent pigments sold by the Mearle Corporaton can also be used in this way or can be added to the sustantially clear outer layer.

If employed, it is preferable that the reflective material comprises at least one member selected from the group consisting of metal flake, iridescent glitter, metallized film and colored polyester foil. The reflective particles preferably have faces that have an individual reflectance of over 75%, more preferably at least 95%, and most preferably 99–100%. For example, flat particles with two opposite faces can be used.

The maximum particle size of the reflective particles should be smaller than the thickness of the cover, and preferably is very small. The particle size preferably is 0.1 mm–1.0 mm more preferably 0.2 mm–0.8 mm, and most preferably 0.25 mm–0.5 mm. The quantity of reflective particles may vary widely, as it will depend upon the desired effect and is best determined experimentally. In general, an aesthetically pleasing reflective appearance can be obtained by using about 0.1–10, or more preferably 1–4 parts by weight reflective particles in the material.

One of the advantages of the at least partially translucent covers of the present invention are that smaller amounts of dye, pigment, optical brightener and/or metal flake are needed than would be required if the covers were made of an opaque material. If an opaque cover were formed, it would be necessary to have complete color coverage on the outer surface of the cover. However, in accordance with the present invention pigment, dye and reflective particles which are well beneath the outer surface, contribute to the visibility of the ball.

Golf balls with clear covers also have a unique appearance. The portion of the cover at edges of the dimples being thicker than the cover at the base of the dimples creates a "shadow" effect on the opaque surface below the clear cover. The thicker the clear cover, the more pronounced the effect. For example, covers having a thickness of between 0.05 and 0.1 inch. A preferred embodiment of the present invention has a thinner cover with a lesser effect. In the preferred mode, the outer clear cover will have a thickness of less than about 0.050 inches. In the most preferred embodiment, it will be less than about 0.040 inches. The urethane and urea examples described herein have thicknesses between about 0.03 and 0.035 inches.

Also, higher dimple surface coverage creates a more appealing look. The examples described herein have dimple surface coverage in excess of 80% of the surface of the ball. With high surface coverage and a thin cover, the edges of the dimple "shadows" merge to give the illusion that they are the surface of the ball. With sufficient dimple coverage, the dimple shadows take on a hexagonal appearance. This is most apparent in the optic yellow urethane and urea examples or in surlyn cover examples in which the outer cover is dyed with blue optical brightener.

The term optical brightener as used herein is generally the same as that set forth in Kirk-Othmer, Encyclopedia of Chemical Technology, 3d Edition, Volume 4, page 213. As there stated, optical brighteners absorb the invisible ultraviolet portion of the daylight spectrum and convert this energy into the longer-wavelength visible portion of the spectrum. Kirk-Othmer describes typical optical brighteners, including stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles. In accordance with the present invention, any of these or other known optical brighteners including derivatives of 4,4'-diamino stilbene-2,2'-disulfonic acid, 4-mthyl-7-diethylamino coumarin and 2,5-bis(5-tert-butyl)-2-benzoxazolyl)thiophene may be used.

The amount of optically active materials to be included in the golf ball cover layer is largely a matter of choice. The amount can range anywhere from the minimum 0.03% level to 20% or more by weight of the resin solids in the clear coat. We have found an amount of about 0.3 to 7% by weight to be a very desirable amount and most prefer an amount of about 0.7% to 6%. However, the brightness can be made even a little greater by adding a greater amount of optically active material.

Fluorescent materials useful in the present invention are commercially available fluorescent pigments and dyes. Some are described in U.S. Pat. Nos. 2,809,954, 2,938,873, 2,851,424 or 3,412,036 which are incorporated by reference herein. A good commercial source for these products is Dayglo Color Corporation. As described in the cited patents, these fluorescent daylight materials are organic co-condensates. They are typically composed of melamine, an aldehyde such as formaldehyde, a heterocyclic compound and/or an aromatic sulfonamide. Typical of such materials is Solvent Yellow 44, compounds which are sold by DayGlo under the trademark Saturn Yellow and by Lawter under the trademark Lemon Yellow. The amount of fluorescent material to be used is largely a matter of choice depending on the brightness desired. However, it is preferred that the amount of fluorescent dye be from about 0.01% to about 0.5% by weight of the cover composition and the amount of fluorescent pigment be from about 0.5% to about 6% by weight of the cover composition.

In general, fluorescent dyes useful in the present invention include dyes from the thioxanthene, xanthene, perylene, perylene imide, coumarin, thioindigoid, naphthalimide and methine dye classes. Useful dye classes have been more completely described in U.S. Pat. No. 5,674,622, which is incorporated herein by reference in its entirety. Representative yellow fluorescent dye examples include, but are not limited to: Lumogen F Orange.TM.240 (BASF, Rensselaer, N.Y.); Lumogen F Yellow.TM.083 (BASF, Rensselaer, N.Y.); Hostasol Yellow.TM.3G (Hoechst-Celanese, Somerville, N.J.); Oraset Yellow.TM.8GF (Ciba-Geigy, Hawthorne, N.Y.); Fluorol 088.TM. (BASF, Rensselaer, N.Y.); Thermoplast F Yellow.TM.084 (BASF, Rensselaer, N.Y.); Golden Yellow.TM.D-304 (DayGlo, Cleveland, Ohio); Mohawk Yellow.TM.D-299 (DayGlo, Cleveland, Ohio); Potomac Yellow.TM.D-838 (DayGlo, Cleveland, Ohio) and Polyfast Brilliant Red.TM.SB (Keystone, Chicago, Ill.)

A single fluorescent dye may be used to color an article of the invention or a combination of one or more fluorescent dyes and/or or optical brighteners and one or more conventional colorants may be used.

Because of the relatively unstable nature of optically active pigments and dyes, and especially because of the outside use to which golf balls are put, it is preferred that a U.V. stabilizer be added to the urethane and urea cover compositions. If either the optically active material or the cover material comes with sufficient U.V. stabilizer, it is obviously not beneficial to add more. However, U.V. absorbers are preferably present in the amount of from about 0.1% to about 3.0% by weight of the cover, and more preferably from about 0.5% to about 2.0%.

In another embodiment of the present invention, a conventional dye instead of a fluorescent dye can be used. Examples of nonfluorescent dye classes that can be used in the present invention include azo, heterocyclic azo, anthraquinone, benzodifuranone, polycyclic aromatic carbonyl, indigoid, polymethine, styryl, di- and tri-aryl carbonium, phthalocyanines, quinopphthalones, sulfur, nitro and nitroso, stilbene, and formazan dyes. The concentration of dye needed is specific to each application. However, typically between about 0.01 and 1 weight percent of regular dye based on total composition cover material is perferable. It will be understood that articles with dye loadings outside this range can be used in accordance with this invention.

In one preferred embodiment, to maintain color of the fluorescent cover, an ultraviolet (UV) overlay layer or coating which effectively filters radiation below 380 nm is use. Hindered amine light stabilizers (HALS) can also be added to ploycarbonate type matrixes to enhance the durability of fluorescent dyes contained therein.

As discussed in more detail below, invention also relates to an embodiment comprising interpenetrating polymer networks or semi-interpenetrating polymer networks comprising a fluorescent dye or non-fluoresent having enhanced durability.

Interpenetrating polymer networks (IPSs), systems comprising two independent crosslinked polymer networks, are known to those of ordinarily skill in the art. See, for example, Encyclopedia of Polymer Science and Engineering Vol. 8, John Wiley & Sons, New York (1987) p. 279 and L. H. Sperling, Introduction to Physical Polyer Science, John Wiley & Sons (1986) pp. 46–47. In particular, IPNs comprising acrylate and urethane networks have been prepared by either sequential or simultaneous (but independent) polymerization of free-radically polymerizable ethylenically-unsaturated acrylate-type monomers and urethane precursors, i.e., polyisocyanate and polyhydroxy coreactants. See, for example, U.S. Pat. Nos. 4,128,600, 4,342,793, 4,921,759, 4,950,696, 4,985,340, 5,147,900, 5,256,170, 5,326,621, 5,360,462, and 5,376,428 which are incorporated by reference.

Articles containing colorants are known to lose their color when exposed to solar radiation for extended times. In particular, fluorescent colorants degrade more quickly than conventional colorants, often turning colorless on exposure to daily solar radiation in a matter of days or months. Even though they are less durable, fluorescent dyes are commonly used for increased visibility of an article due to the visual contrast between a dyed article and its surroundings.

In another preferred embodiment, the cover comprises single phase polymers comprising pigments or dyes such as those, for example, U.S. Pat. Nos. 3,253,146, 5,605,761, and 5,672,643 which are incorporate by reference herein.

In other embodiments comprised of fluorescent products in ployvinylchloride, olefin copolymers and polyurethanes dispersal of a second phase, preferably an acrylate phase is used. More preferably an aromatic acrylate phase, is dispersed into these thermoplastic resins. Preferably, the dispersal provides for the covalent attachment of the fluorescent dye, to assist in preventing physical loss of the dye and provides a protective environment for the dye against photodegradation.

IPNs or semi-IPNs can include polymers that can comprise as a first phase any of crosslinked and/or thermoplastic polyurethanes, polyureas, polyolefins, copolymers of olefins preferably with acrylates, block copolymers, polyvinyl chloride, natural and synthetic rubbers, as well as silicone rubber, and fluoroelastomers.

The second phase of the IPNs and semi-IPNs of the invention, which is the phase that includes a dye, preferably a fluorescent dye, can be a dispersed phase or a continuous phase. Preferable polymers that can comprise the second phase include acrylates, epoxies, and cyanate esters. Most preferably, the second phase comprises an acrylate polymer with aromatic content.

The advantage of this approach is that dye color retention can be improved while maintaining desired physical properties. Depending on the product application, physical properties may include flexibility, strength, transparency or thermoforamability. This can be achieved through the used of a two-phase IPN or semi-IPN system where the fluorescent dye preferably is reacted into a crosslinked, dispersed second phase in a continuous first phase. Therefore, the continuous first phase dominates the physical properties, and the dispersed second phase serves to anchor the dye and improve photodurability. The advantage lies in the independent optimization of both phases. The first phase can be chosen for a particular physical property while the dispersed second phase can be chosen for enhanced dye photodurability. For instance, accelerated weathering studies have shown that photodurability is improved when the dispersed second phase comprises aromatic components.

Golf Ball Covers Including Isocynate

Polyurethane that is useful in the present invention includes the reaction product of polyisocyanate, at least one polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of HDI; triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" isocyanate monomer, typically less than about 0.1% to about 0.5% free monomer. Examples of "low free monomer" diisocyanates include, but are not limited to Low Free Monomer MDI, Low Free Monomer TDI, Low Free MPDI, and Low Free Monomer PPDI.

The at least one polyisocyanate should have less than about 14% unreacted NCO groups. Preferably, the at least one polyisocyanate has less than about 7.9% NCO, more preferably, between about 2.5% and about 7.8%, and most preferably, between about 4% to about 6.5%.

Any polyol available to one of ordinary skill in the art is suitable for use according to the invention. Exemplary polyols include, but are not limited to, polyether polyols, hydroxy-terminated polybutadiene and partially/fully hydrogenated derivatives, polyester polyols, polycaprolactone polyols, and polycarbonate polyols. In one preferred embodiment, the polyol includes polyether polyol, more preferably those polyols that have the generic structure:

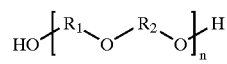

where R$_1$ and R$_2$ are straight or branched hydrocarbon chains, each containing from 1 to about 20 carbon atoms, and n ranges from 1 to about 45. Examples include, but are not limited to, polytetramethylene ether glycol, polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

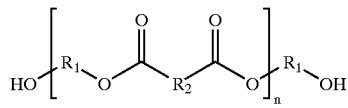

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups. In another embodiment, polycaprolactone polyols are included in the materials of the invention.

Preferably, any polycaprolactone polyols have the generic structure:

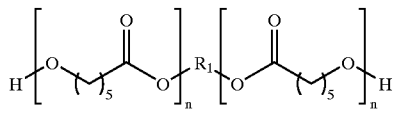

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

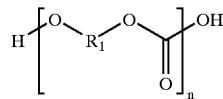

where $R_1$ is predominantly bisphenol A units -(p-$C_6H_4$)—C($CH_3$)$_2$-(p-$C_6H_4$)— or derivatives thereof, and n is the chain length and ranges from 1 to about 20. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000. Polyamine curatives are also suitable for use in the polyurethane composition of the invention and have been found to improve cut, shear, and impact resistance of the resultant balls. Preferred polyamine curatives have the general formula:

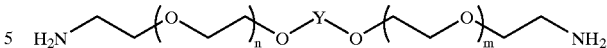

where n and m each separately have values of 0, 1, 2, or 3, and where Y is ortho-cyclohexyl, meta-cyclohexyl, para-cyclohexyl, ortho-phenylene, meta-phenylene, or para-phenylene, or a combination thereof. Preferred polyamine curatives include, but are not limited to, 3,5-dimethylthio-2,4-toluenediamine and isomers thereof (tradename ETHACURE 100 and/or ETHACURE 100 LC); 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; para, para'-methylene dianiline (MDA), m-phenylenediamine (MPDA), 4,4'-methylene-bis-(2-chloroaniline) (MOCA), 4,4'-methylene-bis-(2,6-diethylaniline), 4,4'-diamino-3,3'-diethyl-5,5'-dimethyl diphenylmethane, 2,2', 3,3'-tetrachloro diamino diphenylmethane, 4,4'-methylene-bis-(3-chloro-2,6-diethylaniline), (LONZACURE M-CDEA), trimethylene glycol di-p-aminobenzoate (VERSALINK 740M), and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000. Preferably, n and m, each separately, have values of 1, 2, or 3, and preferably, 1 or 2.

At least one of a diol, triol, tetraol, hydroxy-terminated, may be added to the aforementioned polyurethane composition. Suitable hydroxy-terminated curatives have the following general chemical structure:

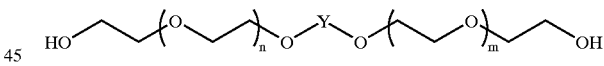

where n and m each separately have values of 0, 1, 2, or 3, and where X is ortho-phenylene, meta-phenylene, para-phenylene, ortho-cyclohexyl, meta-cyclohexyl, or para-cyclohexyl, or mixtures thereof. Preferably, n and m, each separately, have values of 1, 2, or 3, and more preferably, 1 or 2.

Preferred hydroxy-terminated curatives for use in the present invention include at least one of 1,3-bis(2-hydroxyethoxy)benzene and 1,3-bis-[2-(2-hydroxyethoxy)ethoxy]benzene, and 1,3-bis-{2-[2-(2-hydroxyethoxy)ethoxy]ethoxy}benzene; 1,4-butanediol; resorcinol-di-(β-hydroxyethyl)ether; and hydroquinone-di-(β-hydroxyethyl) ether; and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art. Both the hydroxy-terminated and amine curatives can include one or more saturated, unsaturated, aromatic, and cyclic groups. Additionally, the hydroxy-terminated and amine curatives can include one or more halogen groups. Suitable diol, triol, and tetraol groups include ethylene glycol, diethylene glycol, polyethylene glycol, propylene glycol, polypropylene glycol, lower molecular weight polytetramethylene ether glycol, and mixtures thereof. The polyurethane composition can be formed with a blend or mixture of curing agents. If desired, however, the polyurethane composition may be formed with a single curing agent.

The invention is further directed to a golf ball including a translucent cover layer formed from a composition including at least one polyurea formed from a polyurea prepolymer and a curing agent. In one embodiment, the polyurea prepolymer includes at least one diisocyanate and at least one polyether amine.

In this aspect of the invention the diisocyanate is preferably saturated, and can be selected from the group consisting of ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophoronediisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; and mixtures thereof. The saturated diisocyanate is preferably selected from the group consisting of isophoronediisocyanate, 4,4'-dicyclohexylmethane diisocyanate, 1,6-hexamethylene diisocyanate, or a combination thereof. In another embodiment, the diisocyanate is an aromatic aliphatic isocyanate selected from the group consisting of meta-tetramethylxylene diisocyanate; para-tetramethylxylene diisocyanate; trimerized isocyanurate of polyisocyanate; dimerized uredione of polyisocyanate; modified polyisocyanate; and mixtures thereof.

The polyether amine may be selected from the group consisting of polytetramethylene ether diamines, polyoxypropylene diamines, poly(ethylene oxide capped oxypropylene)ether diamines, triethyleneglycoldiamines, propylene oxide-based triamines, trimethylolpropane-based triamines, glycerin-based triamines, and mixtures thereof. In one embodiment, the polyether amine has a molecular weight of about 1000 to about 3000.

The curing agent may be selected from the group consisting of hydroxy-terminated curing agents, amine-terminated curing agents, and mixtures thereof, and preferably has a molecular weight from about 250 to about 4000.

In one embodiment, the hydroxy-terminated curing agents are selected from the group consisting of ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol, preferably having a molecular weight from about 250 to about 3900; and mixtures thereof.

The amine-terminated curing agents may be selected from the group consisting of ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; and mixtures thereof.

In one embodiment, the composition further includes a catalyst that can be selected from the group consisting of a bismuth catalyst, zinc octoate, di-butyltin dilaurate, di-butyltin diacetate, tin (II) chloride, tin (IV) chloride, di-butyltin dimethoxide, dimethyl-bis[1-oxonedecyl)oxy] stannane, di-n-octyltin bis-isooctyl mercaptoacetate, triethylenediamine, triethylamine, tributylamine, oleic acid, acetic acid; delayed catalysts, and mixtures thereof. The catalyst may be present from about 0.005 percent to about 1 percent by weight of the composition.

Any method available to one of ordinary skill in the art may be used to combine the polyisocyanate, polyol or polyamine, and curing agent of the present invention. One commonly employed method, known in the art as a one-shot method, involves concurrent mixing of the polyisocyanate, polyol or polyether amine, and curing agent. This method results in a mixture that is inhomogenous (more random) and affords the manufacturer less control over the molecular structure of the resultant composition. A preferred method of mixing is known as the prepolymer method. In this method, the polyisocyanate and the polyol or polyether amine are mixed separately prior to addition of the curing agent. This method seems to afford a more homogeneous mixture resulting in a more consistent polymer composition.

An optional, filler component may be chosen to adjust the density of the blends described herein, but care should be taken to make sure the optical properties remain as desired. The selection of such filler(s) is dependent upon the type of golf ball desired (i.e., one-piece, two-piece multi-component, or wound), and any filler available to one of ordinary skill in the art is suitable for use according to the invention. Examples of useful fillers include zinc oxide ("ZnO"), barium sulfate, calcium oxide, calcium carbonate, and silica, as well as any salts and oxides thereof. Additional fillers, such as foaming agents, glass and/or plastic microspheres, and various metals, can be added to the polyurethane or polyure compositions of the present invention, in amounts as needed, for their well-known purposes.

It is also preferred that the composition of the present invention include at least one color stabilizer. Color stabilizers include, but are not limited to, UV absorbers, radical scavengers, such as hindered amine light stabilizers ("HALS"), thermal stabilizers and antioxidants, quenchers, such as nickel quenchers, hydroperoxide decomposers, fillers, and mixtures thereof. It has been determined that fillers, such as ZnO and TiO2, pigments, and paints, have some UV absorbing and/or blocking qualities, and as such, can contribute to the color stability of the composition.

Suitable UV absorbers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones, salicylates, and mixtures thereof. Without wishing to be bound by any particular theory, it is believed that these compounds absorb harmful UV light and rapidly convert the light into harmless energy, such that the compounds reduce or prevent the rapid degradation of color in many conventional golf balls.

Preferred substituted triazines include those having the formula:

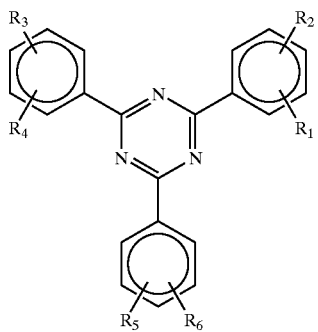

wherein $R_1$ is H, OH; $R_2$ is H, alkoxy, alkylester, hydroxyalkoxy; $R_3$ is alkyl, H; $R_4$ is alkyl, H, alkylester; $R_5$ is alkyl, H; and $R_6$ is alkyl, H, alkylester.

Preferred benzoxazinones include those including the formula:

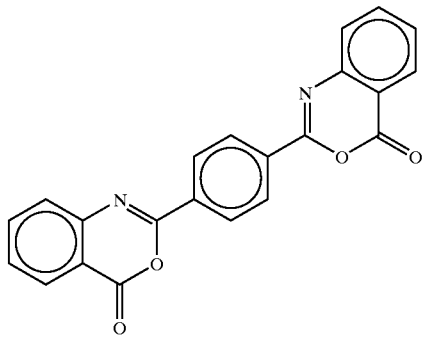

Preferred benzotriazoles include those having the formula:

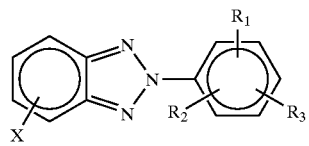

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; $R_3$ is H, alkyl; and X is Cl, Br, I. Preferably X is Cl.

Preferred benzophenones include those having the formula:

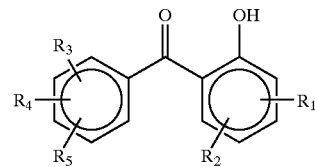

wherein $R_1$ is OH, alkoxy, alkenoic acid alkoxyester, aryloxy, hydroxyalkoxy, hydroxy(alkylether)alkoxy, (polymerized acrylo)alkoxyester, o-alkyl acid ester; $R_2$ is H, $SO_3H$, $SO_3Na$; and $R_3$ is H, OH; $R_4$ is H, alkoxy, OH; and $R_5$ is H, $SO_3Na$.

Preferred benzoates include those having the formula:

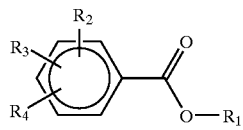

wherein $R_1$ is hydroxyalkylether, alkylphenyl, alkyl, phenyl, hydroxyphenyl; $R_2$ is H, OH, alkyl, hydroxy(alkylether) amino; $R_3$ is H, alkyl, OH; and $R_4$ is H, alkyl.

Preferred formamidines include those having the formula:

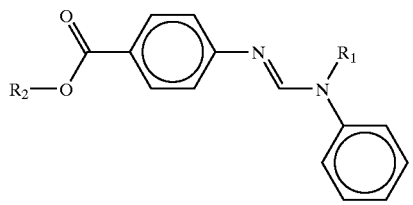

wherein $R_1$ is alkyl, $R_2$ is alkyl.

Preferred cinnamates or propenoates include those having the formula:

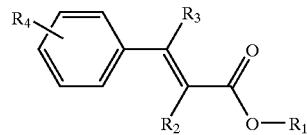

wherein $R_1$ is alkyl; $R_2$ is alkylester, cyano; $R_3$ is H, phenyl; and $R_4$ is H, alkoxy.

Preferred aromatic propanediones include those having the formula:

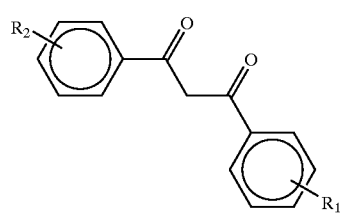

wherein $R_1$ is alkoxy; and $R_2$ is alkyl.

Preferred benzimidazoles include those having the formula:

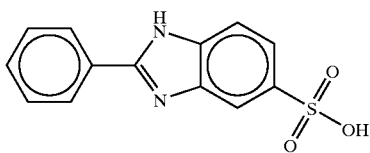

Preferred cycloaliphatic ketones include those having the formula:

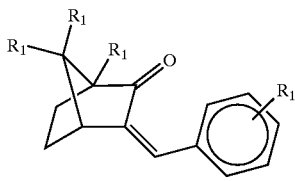

wherein $R_1$ is alkyl.

Preferred formanilides (including oxamides) include those having the formula:

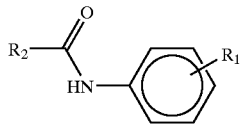

wherein $R_1$ is alkyl; $R_2$ is H, formanilide, alkylalkoxy, and/or contains benzimidazole.

Preferred cyanoacrylates include those having the formula:

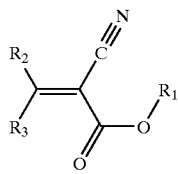

wherein $R_1$ is alkyl, arylcyanoacrylalkyl; $R_2$ is phenyl, H, alkylindoline; and $R_3$ is H, phenyl.

Preferred benzopyranones include those having the formula:

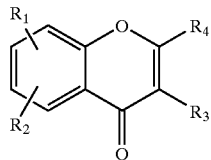

wherein $R_1$; $R_2$; $R_3$; and $R_4$ are OH.

Preferred salicylates include those having the formula:

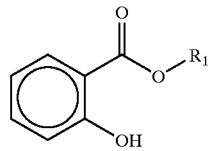

wherein $R_1$ is a linear, cyclic, or branched alkyl group.

The above structures are not intended to be inclusive. One of ordinary skill in the art would be aware that "cross-over" between groups exists, including isomeric structures, and as such, these groups are also suitable in the compositions of the invention.

Suitable aromatic propanedione UV absorbers include, but are not limited to, 4-t-Butyl-4'-methoxydibenzoylmethane or avobenzone, GIVSORB UV-14; and mixtures thereof.

Suitable benzimidazole UV absorbers include, but are not limited to, 2-Phenyl-1H-benzimidazole-5-sulfonic acid, GIVSORB UV-16; and mixtures thereof.

Suitable benzophenone UV absorbers include, but are not limited to, 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy) benzophenone, MARK 1535; 2,4,4'-Trihydroxybenzophenone, MAXGARD 200; 2-Hydroxy-4-(isooctyloxy)benzophenone, MAXGARD 800; 2-Hydroxy-4-dodecyloxybenzophenone, UVINUL 410; 2,2'-Dihydroxy-4,4'-dimethoxy-5,5'-disulfobenzophenone, disodium salt, UVINUL 3048; 2,4-Dihydroxybenzophenone or 4-Benzoylresorcinol, UVINUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4-benzyloxybenzophenone, Seesorb 105; and mixtures thereof.

Suitable benzopyranone UV absorbers include, but are not limited to, 3,3',4',5,7-pentahydroxyflavone or quercetin; and mixtures thereof.

Suitable benzotriazole UV absorbers include, but are not limited to, 2-[2-hydroxy-5-(1,1,3,3-tetramethylbutyl) phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl) benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxy-methyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl)

phenol, TINUVIN 928; 3-(2H-benzotriazol-2-yl)-5-t-butyl-4-hydroxybenzenepropanoic acid, C7–9 branched and linear alkyl esters, TINUVIN 99; 2-(2-hydroxy-5-methylphenyl) benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl) benzotriazole, TINUVIN PS; bis[2-hydroxy-3-(2H-benzotriazol-2-yl)-5-octylphenyl]methane, TINUVIN 360; and mixtures thereof.

Suitable benzoate UV absorbers include, but are not limited to, hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino] benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis (polyethoxy)amino acid polyethoxy ethyl ester, UVINUL P 25; 4-t-Butylphenyl 2-hydroxybenzoate or 4-t-butylphenylsalicylate, Seesorb 202; and mixtures thereof.

Suitable benzoxazinone UV absorbers include, but are not limited to, 2,2'-(p-phenylene)di-3,1-benzoxazin-4-one, CYASORB 3638; and mixtures thereof.

Suitable cinnamates or propenoate UV absorbers include, but are not limited to, dimethyl(p-methoxybenzylidene) malonate, SANDUVOR PR 25; 3-(4-methoxyphenyl)-2-propenoic acid 2-ethylhexyl ester or octyl p-methoxycinnamate, UVINUL 3039; and mixtures thereof.

Suitable cyanoacrylate UV absorbers include, but are not limited to, ethyl-2-cyano-3,3-diphenylacrylate, UVINUL 3035; 2-ethylhexyl-2-cyano-3,3-diphenylacrylate, UVINUL 3039; 1,3-bis-[(2'-cyano-3,3'-diphenylacryloyl)oxy]-2,2-bis-{[(2-cyano-3',3'-diphenylacryloyl)oxy]methyl}propane, UVINUL 3030; 2-Cyano-3-(2-methylindolinyl) methylacrylate, UV Absorber Bayer 340; and mixtures thereof.

Suitable cycloaliphatic ketone UV absorbers include, but are not limited to, 3-(4-methylbenzylidene)-D,L-camphor, GIVSORB UV-15; and mixtures thereof.

Suitable formamidine UV absorbers include, but are not limited to, Ethyl-4-[[(methylphenylamino)methylene] amino]benzoate, GIVSORB UV-2; and mixtures thereof.

Suitable formanilide (including oxamide) UV absorbers include, but are not limited to, N-(2-ethoxyphenyl)-N'-(4-isododecylphenyl)oxamide, SANDUVOR 3206; N-[5-t-Butyl-2-ethoxyphenyl)-N'-(2-ethylphenyl)oxamide, TINUVIN 315; N-(2-ethoxyphenyl)-N'-(2-ethylphenyl)oxamide, TINUVIN 312; 2H-benzimidazole-2-carboxylic acid (4-ethoxyphenyl)amide, UVINUL FK 4105; and mixtures thereof.

Suitable triazine UV absorbers include, but are not limited to, 2-[4,6-bis(2,4-dimethylphenyl)-1,3,5-triazin-2-yl]-5-octyloxyphenol, CYASORB UV 1164; confidential triazine derivative, TINUVIN 1545; 2-(4,6-diphenyl-1,3,5-triazin-2-yl)-5-hexyloxyphenol, TINUVIN 1577 FF; 2-[4-((2-Hydroxy-3-dodecyloxypropyl)oxy)-2-hydroxyphenyl]-4,6-bis(2,4-dimethylphenyl)-1,3,5-triazine, TINUVIN 400; 2,4, 6-Trianilino-p-(carbo-2'-ethylhexyl-1'-oxy)-1,3,5-triazine, UVINUL T-150; and mixtures thereof.

Suitable salicylate UV absorbers include, but are not limited to, 3,3,5-trimetylcyclohexylsalicylate or homomentyylsalicylate, NEO HELIOPAN HMS; menthyl-o-aminobenzoate, NEO HELIOPAN MA; and mixtures thereof.

The TINUVIN compounds are commercially available from Ciba Specialty Chemicals Corporation of Tarrytown, N.Y.; UVINULS are commercially available from BASF Corporation of Charlotte, N.C.; CYASORBS are commercially available from Cytec Industries Inc. of West Paterson, N.J.; SANDUVORS are commercially available from Clariant Corporation of Charlotte, N.C.; NORBLOCS are commercially available from Janssen Pharmaceutica of Titusville, N.J.; Quercetin is commercially available from ACROS Organics of Pittsburgh, Pa.; MAXGARDS are commercially available from Garrison Industries of El Dorado, Ark.; SEESORBS are commercially available from Shipro Kasei of Osaka, Japan; MARK compounds are commercially available from Witco Chemical of Oakland, N.J.; GIVSORBS are commercially available from Givauden-Roure Corp. of Geneva, Switzerland; and NEO HELIOPANS are commercially available from Haarmann & Reimer of Teterboro, N.J.

Other suitable UV absorbers include inorganic pigments such as titanium dioxide, zinc oxide, barium sulfate, violet, PALIOGEN Blue L 6385, ultra marine blue, and other blue pigments; and mixtures thereof.

In a particularly preferred embodiment, the at least one UV absorber is a liquid. Preferably, the UV absorber is a liquid when the UV absorber is present in an amount greater than about 1% of the total polyurethane or polyurea composition. Suitable liquid UV absorbers include, but are not limited to, UVINUL 3039; 2-ethylhexyl p-methoxycinnamate, NEO HELIOPAN AV; UVINUL P25; isoamyl p-methoxycinnamate, NEO HELIOPAN E1000; 2-ethylhexylsalicylate, NEO HELIOPAN OS; 3,3,5-trimetylcyclohexylsalicylate or homomentyylsalicylate, NEO HELIOPAN HMS; menthyl-o-aminobenzoate, NEO HELIOPAN MA; TINUVIN 99; TINUVIN 384; TINUVIN 213; TINUVIN 1130; TINUVIN 109; TINUVIN 400; TINUVIN 571; SANDUVOR 3206; MAXGARD 800; MARK 1535; GIVSORB UV-1; or mixtures thereof.

In a preferred embodiment, the selected UV absorber has an extinction coefficient, $\epsilon$, of greater than about 10,000 L·mol−1·cm−1 at any wavelength between about 290 nm and about 350 nm. More preferably, the selected UV absorber has an $\epsilon$ of between about 10,000 L·mol−1·cm−1 and about 30,000 L·mol−1·cm−−1 at wavelengths between about 290 nm and about 350 nm, and most preferably, between about 10,000 L·mol−1·cm−1 and about 20,000 L·mol−1·cm−1 at wavelengths between about 290 nm and about 350 nm. It is believed that spectrally matching the peak absorbance of the UV absorber to that of the polymer composition provides the most ideal color and light stabilization. For example, UV absorbers that have an absorbance maximum at wavelengths higher than the composition have been found to be less effective than those that absorb at wavelengths that more closely match the absorbance of the polymer, even if the amplitude of the absorbance is lower. Moreover, the refractive indecies of the UV absorber should closely match that of the polymer to maintain the translucent properties. The indecies are preferably within 0.2 of each other, and more preferably within 0.05 of each other.

Preferably, the UV absorbers have certain local absorption maxima between about 280 nm and about 400 nm, as measured in a dilute solution of a non-hydrogen-bonding solvent, such as chloroform or methylene chloride. The UV absorbers may have a single local maximum between about 300 nm to about 360 nm, more preferably between about 315 nm to about 340 nm. Example include, but are not limited to, SANDUVOR VSU, UVINUL 3030, SANDUVOR PR 25, GIVSORB UV-15, and mixtures thereof. Most preferably, the UV absorbers have two local absorption maxima, the first being in the region between about 285 nm and about 315 nm, and the second being in the region between about 320 nm and about 370 nm. Examples of these include, but are not limited to, TINUVIN 328, NORBLOC 6000, NORBLOC 7966, CYASORB 2337, TINUVIN P, GIVSORB UV-13, CYASORB 3638, UVINUL D50, CYASORB UV 24, and mixtures thereof.

Without wishing to be bound by any particular theory, it is believed that radical scavengers, such as hindered amine light stabilizers, function primarily as free radical scavengers. Commercially available examples include, but are not limited to, bis-(1-octyloxy-2,2,6,6-tetramethyl-4-piperidinyl) sebacate, TINUVIN 123, n-butyl-(3,5-di-t-butyl-4-hydroxybenzyl)bis-(1,2,2,6-pentamethyl-4-piperidinyl)malonate, TINUVIN 144, TINUVIN 292, TINUVIN 400, dimethyl succinate with 4-hydroxy-2,2,6,6-tetramethyl-1-piperidineethanol, TINUVIN 622; bis(1,2,2,6,6-pentamethyl-4-piperidinyl) sebacate, bis-(1,2,2,6,6-pentamethyl-4-piperidinyl) sebacate, TINUVIN 765; and bis-(2,2,6,6-tetramethyl-4-piperidinyl) sebacate, TINUVIN 770 from Ciba Specialty Chemicals Corporation; dimethyl succinate with 4-hydroxy-2,2,6,6-tetramethyl-1-piperidineethanol, CHIMASSORB 119; poly{[6-(1,1,3,3-tetramethyl(butyl)amino]-s-triazine-2,4-diyl}[(2,2,6,6-tetramethyl-4-piperidyl)imino]hexamethylene [(2,2,6,6-tetramethyl-4-piperidyl)imino], CHIMASSORB 944; and 1,6-hexanediamine, N,N'-bis-(2,2,6,6-tetramethyl-4-piperidinyl), CHIMASSORB 2020, also from Ciba Specialty Chemicals Corporation; CYNASORB UV-3581 from Cytec Industries Inc; SANDUVOR 3070 from Clariant Corporation of Charlotte, N.C.; UVINULS 4049H and 4050H from BASF Corporation; bis-(substituted) heteropolycyclicdione, UVINUL 4049H; N,N'-1,6-hexanediylbis {N-(2,2,6,6-tetramethyl-4-piperidinyl)-formamide}, UVINUL 4050H; dimethyl succinate polymer with 4-hydroxy-2,2,6,6-tetra-methyl-1-piperidine ethanol, TINUVIN 622LD; hindered amine; SANDUVOR 3070; 3-dodecyl-1-(2,2,6,6-tetramethyl-4-piperidyl-pyrrolidin-2,5-dione, CYASORB UV-3581; poly-methylpropyl-3-oxy-[4 (2,2,6,6-tetramethyl)piperidinyl]siloxane; bis-(1,2,2,6,6-pentamethyl-4-piperidinyl)-sebacate; bis-(2,2,6,6-tetramethyl-4-piperidinyl)-sebacate; bis-(1-octyloxy-2,2,6,6,tetramethyl-4-piperidinyl) sebacate; n-butyl-(3,5-di-t-butyl-4-hydroxybenzyl)bis-(1,2,2,6-pentamethyl-4-piperidinyl) malonate; bis(2,2,6,6-tetramethyl-4-piperidinyl)sebacate; and mixtures thereof.

Examples of other suitable HALS typically include, but are not limited to, those containing at least one of the following structure:

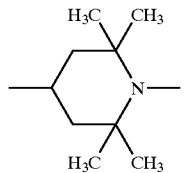

It is believed that thermal stabilizers and antioxidants protect polymers against thermo-oxidative degradation. Some stabilizers include, but not limited to, IRGANOX 245, IRGANOX 1010, IRGANOX 1076, IRGANOX 1135, IRGANOX 5057, and IRGANOX MD 1024 from Ciba Specialty Chemicals Corporation; CYANOXS 790 and 1791 from Cytec Industries Inc; SANDOSTAB P-EPQ from Clariant Corporation; UVINULS 2003 AO and 2012 AO from BASF Corporation; tris(mono-nonylphenyl) phosphite, UVINUL 2003 AO; 1-glyceryl oleate and DL-alpha-tocopherol, UVINUL 2012 AO; triethyleneglycol bis-93-(3'-t-butyl-4'-hydroxy-5'-methyl-phenyl)-propionate, IRGANOX 245; tetrakis[3,5-di-t-butylhydroxyhydrocinnamate)]-methane, IRGANOX 1010; 3,5-di-t-4-hydroxy-hydrocinnamic acid and $C_{7-9}$-branched alkyl esters, IRGANOX 1135; aryl phosphonite, SANDOSTAB P-EPQ; tris(mono-nonylphenyl)phosphite, NAUGARD P; and mixtures thereof.

Also suitable as antioxidants are many hindered phenols, such as 2,6-di-t-butyl-4-methyl-phenol; 2,6-di-t-butyl-4-nonyl-phenol; 2,2'-methylene-bis-(4-methyl-6-t-butyl-phenol); 4,4'-butylidene-bis-(2-t-butyl-5-methyl-phenol); 4,4'-thio-bis-(2-t-butyl-5-methyl-phenol); 2,2'-thio-bis(6-t-butyl-4-methyl-phenol); 2,5-di-t-amyl-hydroquinone; polymeric sterically hindered phenol; octadecyl-3-(3',5'-di-t-butyl-4'-hydroxyphenyl)propionate; tetrakismethylene (3,5-di-t-butyl-4-hydroxyhydrocinnamate)methane; tris(3,5-di-t-butyl-4-hydroxybenzyl)isocyanurate; 2,2'-thiodiethyl bis-(3,5-di-t-butyl-4-hydroxyphenyl)propionate; 1,1,3-tris-(2'-methyl-4'-hydroxy-5'-t-butyl-phenyl)-butane; 2,2'-methylene-bis-6-(1-methyl-cyclohexyl)-papa-cresol; 2,4-dimethyl-6-(1-methyl-cyclohexyl)-phenol; N,N'-hexamethylene bis-(3,5-di-t-butyl-4-hydroxy-hydrocinnamamide); octadecyl-3,5-di-t-butyl-4-hydroxyhydrocinnamate; N-phenylbenzeneamine; reaction products with 2,4,4-trimethylpentene; and mixtures thereof.

Other suitable antioxidants include hindered phenols with the generic structure:

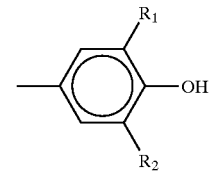

wherein $R_1$ and $R_2$ are t-butyl groups, alkyl groups, or oxyalkylenes; phosphites with the generic structure:

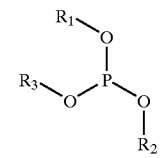

wherein $R_1$, $R_2$, and $R_3$ are alkyl groups or phenyl groups; thioesters having the generic structure:

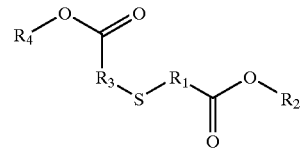

wherein $R_1$, $R_2$, $R_3$, and $R_4$ are alkyl groups; and mixtures thereof.

Phosphites, such as tris-(2,4-di-t-butyl-phenyl)phosphite; tris-(2,4-di-t-butyl-phenyl)phosphite plus distearyl-3,3-thiodipropionate (about 3% on phosphite); bis-(2,4-di-t-butyl-phenyl)pentaerylthritol-diphosphite; tetrakis-(2,4-di-t-butyl-phenyl) 4,4'-biphenylene-diphosphonite; tris-(p-nonylphenyl)phosphite; diisodecyl-phenyl-phosphite; diphenyl-isodecyl-phosphite; triisodecyl-phosphite; trilauryl-phosphite; and mixtures thereof, are also suitable antioxidants. Similarly, many thioesters, such as di-lauryl-3,3'-thio-dipropionate; di-stearyl-3,3'-thio-dipropionate; and mixtures thereof could be used as an antioxidant.

Quenchers are light stabilizers able to take over the energy absorbed by the chromophores present in a plastic material and to dispose of it efficiently to prevent degradation. The energy can be dissipated either as heat or as fluorescent or phosphorescent radiation. For energy transfer to occur from an excited chromophore to the quencher, the latter must have lower energy states than the donor. Without wishing to be bound by any particular theory, it is believed that the transfer can proceed according to two general mechanisms. The first process, the long range energy transfer or Forester mechanism, is based on a dipole-dipole interaction and is usually observed in the quenching of excited singlet states. The distance between chromophore and quencher may be as large as 5 or 10 nm, provided there is a strong overlap between the emission spectrum of the chromophore and the absorption spectrum of the quencher. The Forester mechanism has been considered as a possible stabilization mechanism by typical UV absorbers with extinction coefficients greater than 10,000 L·mol−1 cm−1. Though quenching of carbonyl compounds through this mechanism has been postulated several times it has not been shown unequivocally.

The second type of process quenchers may operate with is the so-called contact, or collisional, or exchange energy transfer. For an efficient transfer to take place, the distance between quencher and chromophore should not exceed about 1.5 nm. This means that the stabilization that can be achieved will depend on the concentration of the quencher and on the lifetime of the excited donor. Considering the longer lifetimes of excited triplet states compared to those of singlet states, energy transfer from triplet states is more likely.

Suitable quenchers include, but are not limited to, nickel dibutyldithiocarbamate; thio bis 2,2'-[4-(1,1,3,3-tetramethylbutyl)-phenyl]nickel-2-ethyl hexanoate; n-butylamine-nickel-2,2'-thio bis(4-t-octylphenolate); nickel-bis-[2,2'-thio bis(4-t-octylphenolate)]; and mixtures thereof, all commercially available from Ciba Corporation.

In another embodiment of the present invention, the polyurethane or polyurea cover compositions can include in situ UV absorbers. In this embodiment, these "reactive" UV stabilizers are chemically bound directly to the polymer backbone, usually to one of the prepolymer components. Without being bound by theory, it is believed that attaching the stabilizers in this manner prevents migration of the stabilizers out of the polymer, and therefore increases the length of time for which color stabilization is provided to the composition. Preferred in situ UV absorbers include, but are not limited to, piperidine-based compounds.

The at least one UV stabilizer should be present in an amount between about 0.1 weight percent and about 6.0 weight percent, more preferably between about 1.0 weight percent to about 5.0 weight percent, and most preferably, between about 3.0 weight percent and about 5.0 weight percent. The HALS, if present, is preferably present in an amount between about 0.01 weight percent and about 3 weight percent, more preferably, between about 0.05 weight percent and about 2 weight percent, and most preferably, between about 0.1 weight percent and about 1 weight percent.

In a preferred embodiment, a color stabilizer package comprises at least one UV absorber and at least one HALS. Preferably, the ratio of UV absorber to HALS is between about 1:1 to about 100:1, more preferably between about 7:1 to about 70:1, and most preferably, between about 30:1 to about 60:1.

In an alternative embodiment, the polyurethane or polyurea composition comprises at least one UV absorber and at least one HALS. Preferably, the ratio of UV absorber to HALS is between about 1:1 to about 50:1, more preferably between about 7:1 to about 50:1, and most preferably, between about 30:1 to about 50:1.

Golf Ball Core Layer(s)

As used herein, the term "golf ball core" is used to refer to any portion of a golf ball surrounded by the cover. In the case of a golf ball having three or more layers, the term "golf ball core" includes at least one inner layer and typically refers to a center surrounded by at least one outer core layer or intermediate layer. Golf balls having at least two layers in the core are known as "dual core" golf balls. The center may be solid, gel-filled, hollow, or fluid-filled, e.g., gas or liquid. The term "inner core" is used interchangeably with "center" or "golf ball center," while the term "outer core" is used interchangeably with "intermediate layer" or "at least one intermediate layer." For example, one optional type of intermediate layer is a tensioned elastomeric material wound about the center. An intermediate layer may be included within a ball having, for example, a single layer or multilayer cover, a single layer or multilayer core, both a single layer cover and core, or both a multilayer cover and a multilayer core, or any similar such combination.

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the polyurethane and polyurea compositions of the present invention may also be incorporated into any component of a golf ball, including the core.

In one embodiment, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending and co-assigned U.S. patent application Ser. No. 10/190,705, entitled "Low Compression, Resilient Golf Balls With Rubber Core," filed Jul. 9, 2002, the entire disclosure of which is incorporated by reference herein, may be used to form the reaction product. Although this polybutadiene reaction product is discussed in a section pertaining to core compositions, the present invention also contemplates the use of the reaction product to form at least a portion of any component of a golf ball.

To obtain a higher resilience and lower compression, a high-molecular weight polybutadiene with a cis-isomer content preferably greater than about 40 percent is converted to increase the percentage of trans-isomer content at any point in the golf ball or portion thereof. In one embodiment, the cis-isomer is present in an amount of greater than about 70 percent, preferably greater than about 80 percent, and more preferably greater than about 90 percent of the total polybutadiene content. In still another embodiment, the cis-isomer is present in an amount of greater than about 95 percent, and more preferably greater than about 96 percent, of the total polybutadiene content.

A low amount of 1,2-polybutadiene isomer ("vinyl-polybutadiene") may be desired in the initial polybutadiene, and the reaction product. In one embodiment, the vinyl polybutadiene isomer content is less than about 7 percent, preferably less than about 4 percent, and more preferably less than about 2 percent.

The polybutadiene material may have a molecular weight of greater than about 200,000. In one embodiment, the polybutadiene molecular weight is greater than about 250,000, and more preferably from about 300,000 to 500,000. In another embodiment, the polybutadiene molecular weight is about 400,000 or greater. It is preferred that the polydispersity of the material is no greater than about 2, more preferably no greater than 1.8, and even more preferably no greater than 1.6.

In one embodiment, the polybutadiene has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In one embodiment, the Mooney viscosity of the unvulcanized polybutadiene is from about 40 to about 80. In another embodiment, the Mooney viscosity is from about 45 to about 60, more preferably from about 45 to about 55. It is also advantageous to mix two or more polybutadienes having different viscosities.

In one embodiment, the center composition includes at least one rubber material having a resilience index of at least about 40. In another embodiment, the resilience index of the at least one rubber material is at least about 50.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

Catalyst(s)

Without being bound by any particular theory, it is believed that a cis-to-trans catalyst component, in conjunction with the free radical source, acts to convert a percentage of the polybutadiene polymer component from the cis- to the trans-conformation. Thus, the cis-to-trans conversion prefereably includes the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of S8 and that "polymeric sulfur" is a structure including at least one additional sulfur relative to the elemental sulfur.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. It is preferred that the cis-to-trans catalyst is present in an amount sufficient to increase the trans-polybutadiene isomer content at least about 15 percent, more preferably at least about 20 percent, and even more preferably at least about 25 percent.

Therefore, the cis-to-trans catalyst is preferably present in an amount from about 0.1 to about 25 parts per hundred of the total resilient polymer component. As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In one embodiment, the cis-to-trans catalyst is present in an amount from about 0.1 to about 12 phr of the total resilient polymer component. In another embodiment, the cis-to-trans catalyst is present in an amount from about 0.1 to about 10 phr of the total resilient polymer component. In yet another embodiment, the cis-to-trans catalyst is present in an amount from about 0.1 to about 8 phr of the total resilient polymer component. In still another embodiment, the cis-to-trans catalyst is present in an amount from about 0.1 to about 5 phr of the total resilient polymer component. The lower end of the ranges stated above also may be increased if it is determined that 0.1 phr does not provide the desired amount of conversion. For instance, the amount of the cis-to-trans catalyst is present may be about 0.5 or more, 0.75 or more, 1.0 or more, or even 1.5 or more.

Suitable organosulfur components for use in the invention include, but are not limited to, at least one of diphenyl disulfide; 4,4'-ditolyl disulfide; 2,2'-benzamido diphenyl disulfide; bis(2-aminophenyl)disulfide; bis(4-aminophenyl) disulfide; bis(3-aminophenyl)disulfide; 2,2'-bis(4-aminonaphthyl)disulfide; 2,2'-bis(3-aminonaphthyl) disulfide; 2,2'-bis(4-aminonaphthyl)disulfide; 2,2'-bis(5-aminonaphthyl)disulfide; 2,2'-bis(6-aminonaphthyl) disulfide; 2,2'-bis(7-aminonaphthyl)disulfide; 2,2'-bis(8-aminonaphthyl)disulfide; 1,1'-bis(2-aminonaphthyl) disulfide; 1,1'-bis(3-aminonaphthyl)disulfide; 1,1'-bis(3-aminonaphthyl)disulfide; 1,1'-bis(4-aminonaphthyl) disulfide; 1,1'-bis(5-aminonaphthyl)disulfide; 1,1'-bis(6-aminonaphthyl)disulfide; 1,1'-bis(7-aminonaphthyl) disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl) disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl) disulfide; bis(4-cyanophenyl)disulfide; bis(2-cyanophenyl) disulfide; bis(4-nitrophenyl)disulfide; bis(2-nitrophenyl)

disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. Most preferred organosulfur components include diphenyl disulfide, 4,4'-ditolyl disulfide, or a mixture thereof, especially 4,4'-ditolyl disulfide.

In one embodiment, the at least one organosulfur component is substantially free of metal. As used herein, the term "substantially free of metal" means less than about 10 weight percent, preferably less than about 5 weight percent, more preferably less than about 3 weight percent, and most preferably less than about 1 weight percent. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$.

In one embodiment, the organosulfur cis-to-trans catalyst is present in the reaction product in an amount from about 0.5 phr or greater. In another embodiment, the cis-to-trans catalyst including a organosulfur component is present in the reaction product in an amount from about 0.6 phr or greater. In yet another embodiment, the cis-to-trans catalyst including a organosulfur component is present in the reaction product in an amount from about 1.0 phr or greater. In still another embodiment, the cis-to-trans catalyst including a organosulfur component is present in the reaction product in an amount from about 2.0 phr or greater.

Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. In one embodiment, the metal-containing organosulfur cis-to-trans catalyst is present in the reaction product in an amount from about 1.0 phr or greater. In another embodiment, the cis-to-trans catalyst including a Group VIA component is present in the reaction product in an amount from about 2.0 phr or greater. In yet another embodiment, the cis-to-trans catalyst including a Group VIA component is present in the reaction product in an amount from about 2.5 phr or greater. In still another embodiment, the cis-to-trans catalyst including a Group VIA component is present in the reaction product in an amount from about 3.0 phr or greater.

The organosulfur component may also be an halogenated organosulfur compound. Halogenated organosulfur compounds include, but are not limited to those having the following general formula:

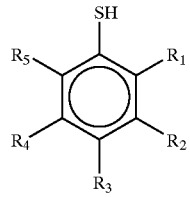

where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 phr, more preferably between about 2.3 phr and about 5 phr, and most preferably between about 2.3 and about 4 phr.

The cis-to-trans catalyst may also include a Group VIA component. As used herein, the terms "Group VIA component" or "Group VIA element" mean a component that includes a sulfur component, selenium, tellurium, or a combination thereof. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt of Norwalk, Conn.

In one embodiment, the cis-to-trans catalyst including a Group VIA component is present in the reaction product in an amount from about 0.25 phr or greater. In another embodiment, the cis-to-trans catalyst including a Group VIA component is present in the reaction product in an amount from about 0.5 phr or greater. In yet another embodiment, the cis-to-trans catalyst including a Group VIA component is present in the reaction product in an amount from about 1.0 phr or greater.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. In one embodiment, the cis-to-trans catalyst including an inorganic sulfide component is present in the reaction product in an amount from about 0.5 phr or greater. In another embodiment, the cis-to-trans catalyst including a Group VIA component is present in the reaction product in an amount from about 0.75 phr or greater. In yet another embodiment, the cis-to-trans catalyst including a Group VIA component is present in the reaction product in an amount from about 1.0 phr or greater.

When a reaction product includes a blend of cis-to-trans catalysts including an organosulfur component and an inorganic sulfide component, the organosulfur component is preferably present in an amount from about 0.5 or greater, preferably 1.0 or greater, and more preferably about 1.5 or greater and the inorganic sulfide component is preferably present in an amount from about 0.5 phr or greater, preferably 0.75 phr or greater, and more preferably about 1.0 phr or greater.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$—$M$—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

Free Radical Source(s)

A free-radical source, often alternatively referred to as a free-radical initiator, is preferred in the composition and method. The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or α,α-bis(t-butylperoxy) diisopropylbenzene, 1,1-bis(t-butylperoxy)-3,3,5-trimethylcyclohexane or 1,1-di(t-butylperoxy)3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

Other examples include, but are not limited to, VAROX® 231XL and Varox® DCP—R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOX® DCP-70 is 70 percent active and has an active oxygen content of 4.18 percent. The peroxide is may be present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. If the peroxide is present in pure form, it is preferably present in an amount of at least about 0.25 phr, more preferably between about 0.35 phr and about 2.5 phr, and most preferably between about 0.5 phr and about 2 phr. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 phr of a pure peroxide is equivalent 4 phr of a concentrate peroxide that is 50 percent active (i.e., 2 divided by 0.5=4).

In one embodiment, the amount of free radical source is about 5 phr or less, but also may be about 3 phr or less. In another embodiment, the amount of free radical source is about 2.5 phr or less. In yet another embodiment, the amount of free radical source is about 2 phr or less. In still another embodiment, the amount of free radical source is about 1 phr or less preferably about 0.75 phr or less.

It should be understood by those of ordinary skill in the art that the presence of certain cis-to-trans catalysts according to the invention be more suited for a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals.

In one embodiment, the ratio of the free radical source to the cis-to-trans catalyst is about 10 or less, but also may be about 5 or less. Additionally, the ratio of the free radical source to the cis-to-trans catalyst may be from about 4 or less, but also may be about 2 or less, and also may be about 1 or less. In another embodiment, the ratio of the free radical source to the cis-to-trans catalyst is about 0.5 or less, preferably about 0.4 or less. In yet another embodiment, the free radical source cis-to-trans catalyst ratio is greater than about 1.0. In still another embodiment, the free radical source cis-to-trans catalyst is about 1.5 or greater, preferably about 1.75 or greater.

Crosslinking Agent(s)

Crosslinkers may be included to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. In one embodiment, zinc methacrylate is used in combination with the zinc salt of pentachlorothiophenol.

The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 40 percent of the polymer component.

In one embodiment, the crosslinking agent is present in an amount greater than about 10 parts per hundred ("phr") parts of the base polymer, preferably from about 20 to about 40 phr of the base polymer, more preferably from about 25 to about 35 phr of the base polymer.

When an organosulfur is selected as the cis-to-trans catalyst, zinc diacrylate may be selected as the crosslinking agent and is present in an amount of less than about 25 phr.

Accelerator(s)

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

Antioxidant

Typically, antioxidants are included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Thus, even with high amounts of the free radical source in the reaction product described previously, such as for example about 3 phr, an amount of antioxidant greater than about 0.3 phr may significantly reduce the effective amount of free radicals that are actually available to assist in a cis-to-trans conversion.

Because it is believed that the presence of antioxidants in the composition may inhibit the ability of free radicals to adequately assist in the cis-to-trans conversion, one way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably are increased by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant.

Another approach is to reduce the levels of or eliminate antioxidants in the composition. For instance, the reaction product of the present invention may be substantially free of antioxidants, thereby achieving greater utilization of the free radicals toward the cis-to-trans conversion. As used herein, the term "substantially free" generally means that the polybutadiene reaction product includes less than about 0.3 phr of antioxidant, preferably less than about 0.1 phr of antioxidant, more preferably less than about 0.05 phr of antioxidant, and most preferably about 0.01 phr or less antioxidant.

The amount of antioxidant has been shown herein to have a relationship with the amount of trans-isomer content after conversion. For example, a polybutadiene reaction product with 0.5 phr of antioxidant cured at 335° F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

In one embodiment, the ratio of the free radical source to antioxidant is greater than about 10. In another embodiment, the ratio of the free radical source to antioxidant is greater than about 25, preferably greater than about 50. In yet another embodiment, the free radical source-antioxidant ratio is about 100 or greater. In still another embodiment, the free radical source-antioxidant ratio is about 200 or greater, preferably 250 or greater, and more preferably about 300 or greater.

If the reaction product is substantially free of antioxidants, the amount of the free radical source is preferably about 3 phr or less. In one embodiment, the free radical source is present in an amount of about 2.5 phr or less, preferably about 2 phr or less. In yet another embodiment, the amount of the free radical source in the reaction product is about 1.5 phr or less, preferably about 1 phr or less. In still another embodiment, the free radical source is present is an amount of about 0.75 phr or less.

When the reaction product contains about 0.1 phr or greater antioxidant, the free radical source is preferably present in an amount of about 1 phr or greater. In one embodiment, when the reaction product has about 0.1 phr or greater antioxidant, the free radical source is present in an amount of about 2 phr or greater. In another embodiment, the free radical source is present in an amount of about 2.5 phr or greater when the antioxidant is present in an amount of about 0.1 phr or greater.

In one embodiment, when the reaction product contains greater than about 0.05 phr of antioxidant, the free radical source is preferably present in an amount of about 0.5 phr or greater. In another embodiment, when the reaction product has greater than about 0.05 phr of antioxidant, the free radical source is present in an amount of about 2 phr or greater. In yet another embodiment, the free radical source is present in an amount of about 2.5 phr or greater when the antioxidant is present in an amount of about 0.05 phr or greater.

Trans-Isomer Conversion

As discussed above, it is preferable to increase cis-isomer to trans-isomer in polybutadiene core materials. In one embodiment, the amount of trans-isomer content after conversion is at least about 10 percent or greater, while in another it is about 12 percent or greater. In another embodiment, the amount of trans-isomer content is about 15 percent or greater after conversion. In yet another embodiment, the amount of trans-isomer content after conversion is about 20 percent or greater, and more preferably is about 25 percent or greater. In still another embodiment, the amount of trans-isomer content after conversion is about 30 percent or greater, and preferably is about 32 percent or greater. The amount of trans-isomer after conversion also may be about 35 percent or greater, about 38 percent or greater, or even about 40 percent or greater. In yet another embodiment, the amount of trans-isomer after conversion may be about 42 percent or greater, or even about 45 percent or greater.

The cured portion of the component including the reaction product of the invention may have a first amount of trans-isomer polybutadiene at an interior location and a second amount of trans-isomer polybutadiene at an exterior surface location. In one embodiment, the amount of trans-isomer at the exterior surface location is greater than the amount of trans-isomer at an interior location. As will be further illustrated by the examples provided herein, the difference in trans-isomer content between the exterior surface and the interior location after conversion may differ depending on the cure cycle and the ratios of materials used for the conversion reaction. For example, it is also possible that these differences can reflect a center with greater amounts of trans-isomer at the interior portion than at the exterior portion.

The exterior portion of the center may have amounts of trans-isomer after conversion in the amounts already indicated previously herein, such as in amounts about 10 percent or greater, about 12 percent or greater, about 15 percent or greater, and the like, up to and including amounts that are about 45 percent or greater as stated above. For example, in one embodiment of the invention, the polybutadiene reaction product may contain between about 35 percent to 60 percent of the trans-isomer at the exterior surface of a center portion. Another embodiment has from about 40 percent to 50 percent of trans-isomer at the exterior surface of a center portion. In one embodiment, the reaction product contains about 45 percent trans-isomer polybutadiene at the exterior surface of a center portion. In one embodiment, the reaction product at the center of the solid center portion may then contain at least about 20 percent less trans-isomer than is present at the exterior surface, preferably at least about 30 percent less trans-isomer, or at least about 40 percent less trans-isomer. In another embodiment, the amount of trans-isomer at the interior location is at least about 6 percent less than is present at the exterior surface, preferably at least about 10 percent less than the second amount.

The gradient between the interior portion of the center and the exterior portion of the center may vary. In one embodiment, the difference in trans-isomer content between the exterior and the interior after conversion is about 3 percent or greater, while in another embodiment the difference may be about 5 percent or greater. In another embodiment, the difference between the exterior surface and the interior location after conversion is about 10 percent or greater, and more preferably is about 20 percent or greater. In yet another embodiment, the difference in trans-isomer content between the exterior surface and the interior location after conversion may be about 5 percent or less, about 4 percent or less, and even about 3 percent or less. In yet another embodiment, the difference between the exterior surface and the interior location after conversion is less than about 1 percent.

Core Hardness

The component including the reaction product of the invention may have a hardness gradient, i.e., the component has a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, a reaction product of this invention shaped into a portion of a golf ball may have a first hardness of about 45 Shore C to about 60 Shore C and a second hardness of about 65 Shore C to about 75 Shore C. In one golf ball formulated according to the invention, the first hardness was about 51 Shore C and a second hardness was about 71 Shore C, providing a hardness difference of greater than 20 percent.

The component including the reaction product may have no hardness gradient, i.e., substantially uniform hardness throughout the component. Thus, in this aspect, the first and second hardness differ by about 5 percent or less, preferably about 3 percent or less, and more preferably by about 2 percent or less. In one embodiment, the hardness is uniform throughout the component.

The golf ball polybutadiene material in the center typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material.

Core Compression

The compression of the core, of golf balls prepared according to the invention is preferably between 20 and 120. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball.

In one embodiment, the core of the present invention has an Atti compression of less than about 80, more preferably, between about 40 and about 80, and most preferably, between about 50 and about 70. In an alternative, low compression embodiment, the core has a compression of less than about 40. In one embodiment, an inner core has a compression of less than about 20. As known to those of ordinary skill in the art, however, the cores generated according to the present invention may be below the measurement of the Atti Compression Gauge.

In an embodiment where the core is hard, the compression may be about 90 or greater. In one embodiment, the compression of the hard core ranges from about 90 to about 120.

Other Properties

The polybutadiene reaction product preferably has a flexural modulus of from about 500 psi to 300,000 psi, preferably from about 2,000 to 200,000 psi.

The desired loss tangent in the polybutadiene reaction product should be less than about 0.15 at −60° C. and less than about 0.05 at 30° C. when measured at a frequency of 1 Hz and a 1 percent strain. In one embodiment, the polybutadiene reaction product material preferably has a loss tangent below about 0.1 at −50° C., and more preferably below about 0.07 at −50° C.

To produce golf balls having a desirable compressive stiffness, the dynamic stiffness of the polybutadiene reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

In one embodiment, the reaction product has a first dynamic stiffness measured at −50° C. that is less than about 130 percent of a second dynamic stiffness measured at 0° C. In another embodiment, the first dynamic stiffness is less than about 125 percent of the second dynamic stiffness. In yet another embodiment, the first dynamic stiffness is less than about 110 percent of the second dynamic stiffness.

Golf Ball Intermediate Layer(s)

When the golf ball of the present invention includes an intermediate layer, such as an inner cover layer or outer core layer, i.e., any layer(s) disposed between the inner core and the outer cover of a golf ball. This layer can include any materials known to those of ordinary skill in the art including thermoplastic and thermosetting materials. For example, the intermediate layer may be formed from any of the polyurea, polyurethane, and polybutadiene materials discussed above. However, certain thermoplastic materials are preferable.

The intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethylpropylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof.

Ionomers

As briefly mentioned above, the intermediate layer may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. In one embodiment, the carboxylic acid groups are neutralized from about 10 percent to about 100 percent. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. In another embodiment, the acrylic or methacrylic acid is present in about 8 to 35 weight percent, more preferably 8 to 25 weight percent, and most preferably 8 to 20 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

A low acid ionomer is believed to impart high spin. Thus, in one embodiment, the intermediate layer includes a low acid ionomer where the acid is present in about 10 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another embodiment, the intermediate layer includes at least one high acid ionomer, for low spin rate and maximum distance. In this aspect, the acrylic or methacrylic acid is present in about 15 to about 35 weight percent, making the ionomer a high modulus ionomer. In one embodiment, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

In one embodiment, the intermediate layer may be formed from at least one polymer containing $\alpha,\beta$-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

In this embodiment, the acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

Examples of these materials are disclosed in U.S. Patent Application Publication Nos. 2001/0018375 and 2001/0019971, which are incorporated herein in their entirety by express reference thereto.

The ionomer compositions may also include at least one grafted metallocene catalyzed polymers. Blends of this embodiment may include about 1 phr to about 100 phr of at least one grafted metallocene catalyzed polymer and about 99 phr to 0 phr of at least one ionomer, preferably from about 5 phr to about 90 phr of at least one grafted metallocene catalyzed polymer and about 95 phr to about 10 phr of at least one ionomer, more preferably from about 10 phr to about 75 phr of at least one grafted metallocene catalyzed polymer and about 90 phr to about 25 phr of at least one ionomer, and most preferably from about 10 phr to about 50 phr of at least one grafted metallocene catalyzed polymer and about 90 phr to about 50 phr of at least one ionomer. Where the layer is foamed, the grafted metallocene catalyzed polymer blends may be foamed during molding by any conventional foaming or blowing agent.

In addition, polyamides, discussed in more detail below, may also be blended with ionomers.

The intermediate layer of inner cover layer as set forth above can also be comprised of more than one color. In a first embodiment, the intermediate layer can be formed by mixing a predetermined amount of material to form the intermediate layers and then dividing the material into two portions. Then an amount of pigment can be added to each portion. The pigment can be different pigments or can different portions of the same pigment. These portions then can be formed around the core. In one embodiment, the material can be divided and formed into hemispherical cups that are then compression molded over the core to form hemispheres of different colors. In another preferred embodiment, the material is divided into two portions and then co-injected over the core or into hemispherical cups as set forth in U.S. Pat. No. 5,783,293 and co-pending U.S. application Ser. No. 10/055,232, which are incorporated by reference herein in their entirety. However, it is preferred that the amount of first material is reduced such that the co-injection process forms cups of different colors. Preferably, the first color covers between 10 and 90% of the surface of the intermediate layer and the second color cover between 90 and 10%.

Non-ionomeric Thermoplastic Materials

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein.

In one embodiment, polyamide homopolymers, such as polyamide 6,18 and polyamide 6,36 are used alone, or in combination with other polyamide homopolymers. In another embodiment, polyamide copolymers, such as polyamide 6,10/6,36, are used alone, or in combination with other polyamide copolymers. Other examples of suitable polyamide homopolymers and copolymers include polyamide polyamide 4, polyamide 6, polyamide 7, polyamide 11, polyamide 12 (manufactured as Rilsan AMNO by Elf Atochem of Philadelphia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6,T wherein T represents terephthalic acid, polyamide 6/6,6/6,10, polyamide 6,10/6,36, polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6,18, polyamide 6,12/6,36, polyamide 6/66/6,18, polyamide 6/66/6,36, polyamide 66/6,10/6,18, polyamide 66/6,10/6,36, polyamide 6/6,12/6,18, polyamide 6/6,12/6,36, and mixtures thereof.

As mentioned above, any of the above polyamide homopolymer, copolymer, and homopolymer/copolymer blends may be optionally blended with nonionomer polymers, such as nonionomer thermoplastic polymers, nonionomer thermoplastic copolymers, nonionomer TPEs, and mixtures thereof.

One specific example of a polyamide-nonionomer blend is a polyamide-metallocene catalyzed polymer blend. The blended compositions may include grafted and/or non-grafted metallocene catalyzed polymers. Grafted metallocene catalyzed polymers, functionalized with pendant groups, such as maleic anhydride, and the like, are available in experimental quantities from DuPont. Grafted metallocene catalyzed polymers may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

Another example of a polyamide-nonionomer blend is a polyamide and non-ionic polymers produced using non-metallocene single-site catalysts. As used herein, the term "non-metallocene catalyst" or non-metallocene single-site catalyst" refers to a single-site catalyst other than a metallocene catalyst. Examples of suitable single-site catalyzed polymers are disclosed in co-pending U.S. patent application Ser. No. 09/677,871, of which the entire disclosure is incorporated by reference herein.

Nonionomers suitable for blending with the polyamide include, but are not limited to, block copoly(ester) copolymers, block copoly(amide) copolymers, block copoly(urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly(phenylene sulfide), reinforced engineering plastics, acrylic-styrene-acrylonitrile, poly(tetrafluoroethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(4-dodecylstyrene), poly(4-tetradecylstyrene), poly(ethylene oxide), poly(oxymethylene), poly(silazane), poly(furan tetracarboxylic acid diimide), poly(acrylonitrile), poly("-methylstyrene), as well as the classes of polymers to which they belong and their copolymers, including functional comonomers, and blends thereof.

In one embodiment, the non-ionomeric materials have a hardness of about 60 Shore D or greater and a flexural modulus of about 30,000 psi or greater.

The intermediate layer may also be formed from the compositions as disclosed in U.S. Pat. No. 5,688,191, the entire disclosure of which is incorporated by reference herein, which are listed in Table 2 below.

TABLE 2

INTERMEDIATE LAYER COMPOSITIONS AND PROPERTIES

| Sample | | Hardness (Shore D) | Resilience | Flex Modulus (psi) | Tensile Modulus (psi) | % Strain at Break |
|---|---|---|---|---|---|---|
| 1A | 0% Estane 58091 100% Estane 58861 | 28 | 54 | 1,720 | 756 | 563 |
| 1B | 25% Estane 58091 75% Estane 58861 | 34 | 41 | 2,610 | 2,438 | 626 |
| 1C | 50% Estane 58091 50% Estane 58861 | 44 | 31 | 10,360 | 10,824 | 339 |
| 1D | 75% Estane 58091 25% Estane 58861 | 61 | 34 | 43,030 | 69,918 | 149 |
| 1E | 100% Estane 58091 0% Estane 58861 | 78 | 46 | 147,240 | 211,288 | 10 |
| 2A | 0% Hytrel 5556 100% Hytrel 4078 | 40 | 47 | 8,500 | 7,071 | 527 |
| 2B | 25% Hytrel 5556 75% Hytrel 4078 | 43 | 51 | 10,020 | 9,726 | 441 |

TABLE 2-continued

INTERMEDIATE LAYER COMPOSITIONS AND PROPERTIES

| Sample | | Hardness (Shore D) | Resilience | Flex Modulus (psi) | Tensile Modulus (psi) | % Strain at Break |
|---|---|---|---|---|---|---|
| 2C | 50% Hytrel 5556 50% Hytrel 4078 | 45 | 47 | 12,280 | 10,741 | 399 |
| 2D | 75% Hytrel 5556 25% Hytrel 4078 | 48 | 53 | 13,680 | 13,164 | 374 |
| 2E | 100% Hytrel 5556 0% Hytrel 4078 | 48 | 52 | 12,110 | 15,231 | 347 |
| 3A | 0% Hytrel 5556 100% Hytrel 3078 | 30 | 62 | 3,240 | 2,078 | 810 no break |
| 3B | 25% Hytrel 5556 75% Hytrel 3078 | 37 | 59 | 8,170 | 5,122 | 685 |
| 3C | 50% Hytrel 5556 50% Hytrel 3078 | 44 | 55 | 15,320 | 10,879 | 590 |
| 3D | 75% Hytrel 5556 25% Hytrel 3078 | 53 | 50 | 19,870 | 16,612 | 580 |
| 3E | 100% Hytrel 5556 0% Hytrel 3078 | 58 | 50 | 54,840 | 17,531 | 575 |
| 4A | 0% Hytrel 4078 100% Pebax 4033 | 46 | 51 | 11,150 | 8,061 | 597 |
| 4B | 25% Hytrel 4078 75% Pebax 4033 | 46 | 53 | 10,360 | 7,769 | 644 |
| 4C | 50% Hytrel 4078 50% Pebax 4033 | 45 | 52 | 9,780 | 8,117 | 564 |
| 4D | 75% Hytrel 4078 25% Pebax 4033 | 42 | 53 | 9,310 | 7,996 | 660 |
| 4E | 100% Hytrel 3078 0% Pebax 4033 | 40 | 51 | 9,250 | 6,383 | 531 |
| 5A | 0% Hytrel 3078 100% Estane 58091 | 77 | 50 | 156,070 | 182,869 | 9 |
| 5B | 25% Hytrel 3078 75% Estane 58091 | 65 | 48 | 87,680 | 96,543 | 33 |
| 5C | 50% Hytrel 3078 50% Estane 58091 | 52 | 49 | 53,940 | 48,941 | 102 |
| 5D | 75% Hytrel 3078 25% Estane 58091 | 35 | 54 | 12,040 | 6,071 | 852 |
| 5E | 100% Hytrel 3078 0% Estane 58091 | 29 | 50 | 3,240 | 2,078 | 810 no break |
| 6A | 100% Kraton 1921 0% Estane 58091 0% Surlyn 7940 | 29 | 59 | 24,300 | 29,331 | 515 |
| 6B | 50% Kraton 1921 50% Estane 58091 0% Surlyn 7940 | 57 | 49 | 56,580 | — | 145 |
| 6C | 50% Kraton 1921 0% Estane 58091 50% Surlyn 7940 | 56 | 55 | 28,290 | 28,760 | 295 |
| 7A | 33.3% Pebax 4033 33.3% Estane 58091 33.3% Hytrel 3078 | 48 | 50 | 41,240 | 30,032 | 294 |
| 7B | 30% Pebax 4033 40% Estane 58091 10% Hytrel 3078 | 48 | 50 | 30,650 | 14,220 | 566 |
| 7C | 20% Pebax 4033 40% Estane 58091 40% Hytrel 3078 | 41 | 54 | 24,020 | 16,630 | 512 |

Golf Ball Construction

The compositions of the present invention may be used with many types of ball construction. For example, the ball may have a three-piece design, a double core, a double cover, multiple intermediate layers, a multi-layer core, and/or a multi-layer cover depending on the type of performance desired of the ball. As used herein, the term "multilayer" means at least two layers. For example, the compositions of the invention may be used in a core, intermediate layer, and/or cover of a golf ball, each of which may have a single layer or multiple layers.

As described above in the core section, a core may be a one-piece core or a multilayer core, both of which may be solid, semi-solid, hollow, fluid-filled, or powder-filled. A multilayer core is one that has an innermost component with an additional core layer or additional core layers disposed thereon. For example, FIG. 1 shows a golf ball 1 having a core 2 and a cover 3. In one embodiment, the golf ball of FIG. 1 represents a core 2 of polybutadiene reaction material, other conventional materials or thermoplastic materials and a cover 3 including the translucent polyurethane or polyurea composition of the invention. In another embodiment, the golf ball of FIG. 1 represents a core 2 formed from polybutadiene reaction material with an optically active chemical additive and a cover 3 including the transparent polyurethane or polyurea composition of the invention.

In addition, when the golf ball of the present invention includes an intermediate layer, such as an inner cover layer or outer core layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

FIG. 2 illustrates a multilayer golf ball 11, including a cover 13, at least one intermediate layer 14, and a core 12. In one embodiment, the golf ball 11 of FIG. 2 may include a core 12 of polybutadiene reaction material, an intermediate layer 14, and a cover 13 formed of the translucent composition of the invention. In addition, the golf ball 21 of FIG. 3 has a core 22 of polybutadiene reaction material or other conventional core materials, at least one ionomer intermediate layer 24 with an optically active chemical additive, and a translucent cover 23.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball 31 of FIG. 4 may include a core layer 32, a tensioned elastomeric layer 34 wound thereon, and a cover layer 33. In particular, the golf ball 31 of FIG. 4 may have a core 32 made of a polybutadiene reaction product, an intermediate layer including a tensioned elastomeric material 34 and cover 33 including at least one translucent polyurethane or polyurea. The tensioned elastomeric material may be formed of any suitable material known to those of ordinary skill in the art, but is preferably a wound layer such as that in U.S. Pat. No. 6,149,535 which is incorporated by reference herein.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover such that it can be seen there-through.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a polybutadiene reaction product with fluorine gas. In one embodiment, the moisture barrier layer has a water vapor transmission rate that is sufficiently low to reduce the loss of COR of the golf ball by at least 5 percent if the ball is stored at 100° F. and 70 percent relative humidity for six weeks as compared to the loss in COR of a golf ball that does not include the moisture barrier, has the same type of core and cover, and is stored under substantially identical conditions.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, which is incorporated by reference in its entirety.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. Certain compositions may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layer vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688, 191, 5,713,801, 5,803,831, 5,885,172, 5,919,100, 5,965,669, 5,981,654, 5,981,658, and 6,149,535, as well as in Publication Nos. US2001/0009310 µl, US2002/0025862, and US2002/0028885. The entire disclosures of these patents and published patent applications are incorporated by reference herein.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784, 5,484,870, and, the disclosures of which are incorporated herein by reference in their entirety.

The cores of the invention may be formed by any suitable method known to those of ordinary skill in art. When the cores are formed from a thermoset material, compression molded is a particularly suitable method of forming the core. In a thermoplastic core embodiment, on the other hand, the cores may be injection molded.

For example, methods of converting the cis-isomer of the polybutadiene resilient polymer core component to the trans-isomer during a molding cycle are known to those of ordinary skill in the art. Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to those of ordinary skill in the art, and such equipment may include a Banbury mixer, a two-roll mill, or a twin screw extruder. Suitable mixing speeds and temperatures are well-known to those of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 to about 18 minutes, preferably from about 8 to about 15 minutes, and more preferably from about 10 to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. Those of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

The castable reactive liquid polyurethanes and polyurea materials of the invention may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once the polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 300–500 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has at least five different sizes of dimples.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 90 of the surface of the intermediate layer.

In an alternative embodiment, the golf ball may have a non-planar parting line allowing for some of the plurality of dimples or projections to be disposed about the equator.

Several additional non-limiting examples of dimple patterns with varying sizes of dimples are also provided in U.S. Pat. No. 6,213,898, the entire disclosures of which is incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 300–360 dimples. In one embodiment, the dimple count on the ball is about 360–400 dimples.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-processing

The golf balls of the present invention may be clear coated, or surface treated for further benefits.

For example, golf balls covers frequently contain a fluorescent material and/or a dye or pigment to achieve the desired color characteristics. A golf ball of the invention may also be treated with a base resin composition, however, as disclosed in U.S. Patent Publication No. 2002/0082358, which includes a 7-triazinylamino-3-phenylcoumarin derivative as the fluorescent agent to provide improved weather resistance and brightness.

In addition, trademarks or other indicia may be printed, i.e., pad-printed or ink jet printed, on the outer surface of the ball cover, and the outer surface is then treated with at least one clear coat to give the ball a glossy finish and protect the indicia. Alternately, the indicia can be printed on the inner layer such that it is visible through the translucent cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover or inner cover, irradiating the cover portion, wherein the irradiated cover portion is ablated to form a detectable mark, wherein no significant discoloration of the cover portion results therefrom. Ablation is discussed in U.S. patent application Ser. No. 09/739,469, filed Dec. 18, 2002, entitled "Laser Marking of Golf Balls," which is incorporated in its entirety by reference herein.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Thus, while it is not desirable to use pigmented coating on the golf balls of the present invention when formed with the translucent compositions, the golf balls of the present invention may be painted, coated, or surface treated for further benefits. For example, the value of golf balls made according to the invention and painted offer enhanced color stability as degradation of the surface paint occurs during the normal course of play. The mainstream technique used nowadays for highlighting whiteness is to form a cover toned white with titanium dioxide, subjecting the cover to such surface treatment as corona treatment, plasma treatment, UV treatment, flame treatment, or electron beam treatment, and applying one or more layers of clear paint, which may contain a fluorescent whitening agent. This technique is productive and cost effective.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 to 1.64 inches.

When the core includes an inner core layer and an outer core layer, the inner core layer is preferably about 0.09 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.2 inches to about 0.3 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 70 Shore D.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 62 Shore D. In one embodiment, the cover has a hardness of about 40 Shore D to about 65 Shore D. In another embodiment, the cover has a hardness less than about 60 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less.

In yet another embodiment, the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.8 to 1.0 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 40.

In an alternative, low compression embodiment, the core has a inner component with compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression about 90 to about 120.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s to about 255 ft/s. In another embodiment, the initial velocity is about 250 ft/s or greater. In one embodiment, the initial velocity is about 253 ft/s to about 254 ft/s. In yet another embodiment, the initial velocity is greater than about 255 ft/s. While the current rules on initial velocity require that golf ball manufacturers stay within the limit, one of ordinary skill in the art would appreciate that the golf ball of the invention would readily convert into a golf ball with initial velocity outside of this range.

The present invention contemplates golf balls having CORs measured at 125 ft/sec from about 0.7 to about 0.85. In one embodiment, the COR is about 0.75 or greater, preferably about 0.78 or greater. In another embodiment, the ball has a COR of about 0.8 or greater. Preferably, the COR at 125 ft/sec is between about 0.81 and 0.85.

In addition, the ball preferably has a COR at 143 ft/sec of about 0.780 or more. In one embodiment, the COR is between about 0.78 and 0.84.

Flexural Modulus

Accordingly, it is preferable that the golf balls of the present invention have an intermediate layer with a flexural modulus of about 500 psi to about 500,000 psi. More preferably, the flexural modulus of the intermediate layer is about 10,000 psi to about 100,000 psi. Most preferably, the flexural modulus of the intermediate layer is about 50,000 psi to about 100,000 psi.

The flexural moduli of the cover layer is preferably about 2,000 psi or greater, and more preferably about 5,000 psi or greater. In one embodiment, the flexural modulus of the cover is from about 10,000 psi to about 30,000 psi. More preferably, the flexural modulus of the cover layer is about 15,000 psi to about 30,000 psi.

In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably between about 500 and 5,000 psi.

Adhesion Strength

The adhesion, or peel, strength of the cover compositions of the invention is preferably about 5 $lb_f$/in or greater. Preferably, the adhesion strength is about 20 $lb_f$/in or greater.

Light Stability

The light stability of the cover may be quantified by the difference in yellowness index (*Y1), i.e., yellowness measured after a predetermined exposure time—yellowness before exposure. In one embodiment, the *Y1 is about 10 or less after 5 days (120 hours) of exposure, preferably about 6 or less after 5 days of exposure, and more preferably about 4 or less after 5 days of exposure. In one embodiment, the *Y1 is about 2 or less after 5 days of exposure, and more preferably about 1 or less after 5 days of exposure. The difference in the b chroma dimension (*b*, yellow to blue) is also a way to quantify the light stability of the cover. In one embodiment, the *b* is about 4 or less after 5 days (120 hours) of exposure, preferably about 3 or less after 5 days of exposure, and more preferably about 2 or less after 5 days of exposure. In one embodiment, the *b* is about 1 or less after 5 days of exposure.

The term "about," as used herein in connection with one or more numbers or numerical ranges, should be understood to refer to all such numbers, including all numbers in a range.

As used herein, the term "polyurethane composition" refers to a combination of the reaction product of a prepolymer including at least one polyisocyanate and at least one polyol, and at least one curing agent, in addition to the color stabilizer component.

As used herein, the term "ATTI compression" is defined as the deflection of an object or material relative to the deflection of a calibrated spring, as measured with an Atti Compression Gauge, that is commercially available from Atti Engineering Corp. of Union City, N.J. ATTI compression is typically used to measure the compression of a golf ball. However, when referring to the compression of a core, it is preferred to use a compressive load measurement.

EXAMPLES

The following example is provided for illustrative purposes only and is not to be construed as limiting the scope of the invention in any manner.

Example 1

Polyurethane Golf Ball Covers

The first golf ball prepared according to the invention has an outer cover layer formed of the polyurethane composition of the present invention including a reaction product of 4,4'-diphenylmethane diisocyanate ("MDI"), polytetramethylene ether glycol ("PTMEG") or polycapralactone, a mixture of 3,5-dimethylthio-2,4-toluenediamine and 3,5-dimethylthio-2,6-toluenediamine curatives (Ethacure 300) or 1,4-butaindiol curatives, and UV stabilizers TINUVIN 571 and TINUVIN 765. The golf ball's outer cover layer was prepared according to the golf ball formation methods described in U.S. Pat. Nos. 5,733,428 and 5,888,437, which are incorporated in their entirety herein by reference.

The inner cover or intermediate layer was comprised of a blend of ionomers with flourescent yellow pigment. Preferably, the inner cover can be comprised of an ionomer blend such as SURLYN 7940 and 8945 and between 1 and 10% by weight of Solvent Yellow 44. An favorable example was made with 5% Solvent Yellow 44.

The cover of the embodiment was about 0.035 inches thick and the inner cover of intermediate layer was about 0.03 inches thick. These were formed on a 1.55" core as set forth above.

Example 2

$H_{12}$MDI Polyether Urea Golf Ball Covers

A golf ball can be made having the cover formulated from a composition including a prepolymer formed of $H_{12}$MDI and polyoxyalkylene, having a molecular weight of about 2000, cured with 4,4'-bis-(sec-butylamino)-dicyclohexylmethane (Clearlink 1000). A golf ball inner cover and core similar to Example 1 is preferred.

TABLE 9

PHYSICAL PROPERTIES OF BALLS ACCORDING TO EXAMPLES 1 AND 2

| Ball Properties/Ball Types | Polyurethane | Polyurea |
|---|---|---|
| Nameplate Average | 1.683 | 1.686 |
| Equator Average | 1.681 | 1.684 |
| Weight Average, oz | 1.597 | 1.600 |
| Compression Average | 89 | 92 |
| CoR @ 125 ft/sec | 0.807 | 0.815 |
| Cold Crack Test, 5° F. | no failure | no failure |

Example 3

$H_{12}$MDI Polyether Urea Golf Ball Covers

Another preferred embodiment is a golf ball like that in Example 2, but with an outer cover of the formula set forth above with the addition of between about 0.003 and 0.03% blue optical brightner such as DayGlo blue A-19. For a light blue hint, 0.003% can be used and for a true blue highlight, 0.01% blue can be added. In this example, the inner cover preferably comprises about 5% white pigment.

Example 4

$H_{12}$MDI Polyether Urea Golf Ball Covers

Another preferred embodiment is a three piece golf ball with an outer cover of the formula set forth in Example 2 with the addition of between about 0.001 and 0.01% pearlescent or iridescent pigment such as the Mearlin Luster Pigments available from Mearl. In this embodiment, the inner cover or intermediate layer preferably comprises about 5% white pigment.

Example 5

Ionomer Golf Ball Covers

Another preferred embodiment is a three piece golf ball with an outer cover comprised of a blend of ionomer(s) or ionomers with Metallocene or Nucrel with the addition of between about 0.001 and 0.01% pearlescent or iridescent pigment such Mearlin Luster Pigments available from Mearl. In this example, the inner cover preferably comprises about 5% white pigment.

For example, the inner cover or intermediate layer can comprise a blend of ionomer resins such as SURLYN 8528 and 9650 with about 5% white color concentrate. The outer cover can comprise a blend of Fuseabond (Metallocene) SURLYN 7940 and 8945 and 0.001% pearlescent pigment.

Example 6

Ionomer Golf Ball Covers

Another preferred embodiment is an outer cover comprised of a blend of ionomer(s) or ionomer(s) with Metallocene or Nucrel with the addition of between about 0.001 and 0.01% blue optical brightner. In this example, the inner cover preferably comprises about 5% white pigment.

In this embodiment, the inner cover can comprise a blend of ionomer resins such as SURLYN 8528 and 9650 with about 5% white color concentrate. The outer cover can comprise a blend of Fuseabond (Metallocene), SURLYN 7940 and 8945 and 0.003% DayGlo blue A-19. Another embodiment with a deeper blue color can comprise about 0.006% DayGlo blue A-19.

Example 7

Polyurethane/Polyurea Multi-color Golf Ball Covers

The first golf ball prepared according to this embodiment has a optically clear or substantially clear outer cover layer formed of a polyurethane or polyurea composition. The outer cover of the present invention can be comprised of a reaction product of 4,4'-diphenylmethane diisocyanate ("MDI"), polytetramethylene ether glycol ("PTMEG") or polycapralactone, a mixture of 3,5-dimethylthio-2,4-toluenediamine and 3,5-dimethylthio-2,6-toluenediamine curatives (Ethacure 300) or 1,4-butaindiol curatives, and UV stabilizers such as TINUVIN 571 and TINUVIN 765. The outer cover can also be formulated from a composition including a prepolymer formed of $H_{12}$MDI and polyoxyalkylene, having a molecular weight of about 2000, cured with 4,4'-bis-(sec-butylamino)-dicyclohexylmethane (Clearlink 1000). The golf ball's outer cover layer is prepared according to the golf ball formation methods described in U.S. Pat. Nos. 5,733,428 and 5,888,437.

The inner cover or intermediate layer is comprised of a thermoplastic composition such a blend of ionomers. Preferably, two blends with different pigments are co-injected as set forth in U.S. Pat. No. 5,783,293 and co-pending U.S. application Ser. No. 10/055,232. Preferably, the inner cover can be comprised of an ionomer blend such as SURLYN 7940 and 8945, where the first portion contains between 1 and 10% by weight of or a first color such as Solvent Yellow 44 and a second portion to be co-injected contains between 1 and 10% or a second color such as white or blue. A favorable example can be made with a first portion containing about 5% Solvent Yellow 44 and a second portion containing about 5% white concentrate, wherein the ball has about 10 to 90% of its inner surface made of the first color and 90–10% of the second color. Still further, a small percentage of pigment or optical brightner can be added to the outer cover to provider further color enhancement. Preferably, less than 0.05% pigment or optical brightner is added to the outer cover. For really exceptional colors, the first and second portions of the inner cover can include pearlescent pigments such as those from Mearl.

The cover of the embodiment was about 0.035 inches thick and the inner cover of intermediate layer was about 0.03 inches thick. These were formed on a 1.55" core as set forth above.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a center, a cover, and, at least one intermediate layer disposed between the center and the cover, wherein the cover is formed from a substantially translucent composition comprising polyurea in a reaction casted layer, and the intermediate layer is comprised of pigment.

2. The golf ball of claim 1, wherein the intermediate layer contributes to the color of the ball.

3. The golf ball of claim 1, wherein the cover has at least one of a material hardness of less than about 70 Shore D, a flexural modulus of less than about 75,000 psi, and a dimple coverage of greater than about 65% and the ball has an ATTI compression of less than about 120.

4. The golf ball of claim 1, wherein the cover includes an outer surface with indicia.

5. The golf ball of claim 1, wherein the intermediate layer includes an outer surface with indicia.

6. The golf ball of claim 1, wherein the cover further comprises color stabilizer comprising a UV absorber or a light stabilizer.

7. The golf ball of claim 6, wherein the UV absorber comprises triazines, benzoxazinones, benzotriazoles, benzophenones, benzoates, formamidines, cinnamates/propenoates, aromatic propanediones, benzimidazoles, cycloaliphatic ketones, formanilides, cyanoacrylates, benzopyranones, and mixtures thereof.

8. The golf ball of claim 6, wherein the UV absorber is present in an amount between about 0.1 weight percent and about 6.0 weight percent.

9. The golf ball of claim 6, wherein the light stabilizer comprises bis-(substituted) heteropolycyclicdione; N,N'-1,6-hexanediylbis {N-(2,2,6,6-tetramethyl-4-piperidinyl)-formamide}; dimethyl succinate polymer with 4-hydroxy-2,2,6,6-tetra-methyl-1-piperidine ethanol; bis-(1,2,2,6,6-pentamethyl-4-piperidinyl) sebacate; hindered amine; 3-dodecyl-1-(2,2,6,6-tetramethyl-4-piperidyl-pyrrolidin-2,5-dione; poly-methylpropyl-3-oxy-[4(2,2,6,6-tetramethyl) piperidinyl] siloxane; bis-(1,2,2,6,6-pentamethyl-4-piperidinyl)-sebacate; bis-(2,2,6,6-tetramethyl-4-piperidinyl)-sebacate; bis-(1-octyloxy-2,2,6,6,tetramethyl-4-piperidinyl) sebacate; n-butyl-(3,5-di-t-butyl-4-hydroxybenzyl) bis-(1,2,2,6-pentamethyl-4-piperidinyl) malonate; bis-(2,2,6,6-tetramethyl-4-piperidinyl) sebacate; compounds containing at least one of the following structure:

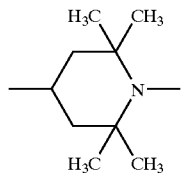

and mixtures thereof.

10. The golf ball of claim 9, wherein the light stabilizer is present in an amount between about 0.01 weight % and about 3 weight %.

11. The golf ball of claim 1, wherein the polyurea is derived from an isocyanate, the isocyanate comprises 4,4'-diphenylmethane diisocyanate; polymeric 4,4'-diphenylmethane diisocyanate; carbodiimide-modified liquid 4,4'-diphenylmethane diisocyanate; 4,4'-dicyclohexylmethane diisocyanate; p-phenylene diisocyanate; toluene diisocyanate; 3,3'-dimethyl-4,4'-biphenylene diisocyanate; isophoronediisocyanate; hexamethylene diisocyanate; naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of methyl cyclohexylene diisocyanate; isocyanurate of 2,4,4-trimethyl-1,6-hexane diisocyanate; tetracene diisocyanate; napthalene diisocyanate; anthracene diisocyanate; and mixtures thereof.

12. The golf ball of claim 1, wherein the polyurea is derived from a curing agent of a polyamine or a polyol.

13. The golf ball of claim 1, wherein the translucent composition is comprised of a prepolymer comprising an isocyanate and an amine.

14. The golf ball of claim 1, wherein the pigment is comprised of between 1 and 10% white color concentrate and the outer cover comprises between about 0.001 and 0.01% of optical brightner or pearlescent pigment.

15. The golf ball of claim 1, wherein the pigment is comprised of between 1 and 10% yellow color concentrate and the outer cover is substantially optically clear.

16. The golf ball of claim 1, wherein the intermediate layer is comprised of an ionomer and between about 1 and 10% white color concentrate and the outer cover is comprised of a polyurea with between about 0.001 and 0.01% pearlescent pigment.

17. The golf ball of claim 1, wherein the intermediate layer is comprised of an ionomer and between about 1 and 10% white color concentrate and the outer cover is comprised of a polyurea with between about 0.001 and 0.01% blue optical brightner.

18. A golf ball comprising a polyurea cover, a polyurea core and an intermediate layer disposed between the core and the cover, wherein the cover is subtantially translucent with a thickness of about 0.02 inches to about 0.05 inches and comprises a reaction castable layer, and the intermediate layer comprise an ionomer and a pigment between 1 and 10% effecting the appearance of the ball.

19. The golf ball of claim 18, wherein the cover is comprised of between about 0.01 and 0.5% florescent dye.

20. The golf ball of claim 19, wherein the cover is further comprised of between about 0.001 and 0.01% optical brightener.

21. The golf ball of claim 18, wherein the intermediate layer is comprised of an optical brightener.

22. The golf ball of claim 18, further comprising indicia on an outer surface of the cover.

23. The golf ball of claim 18, further comprising indicia on an outer surface of the intermediate layer.

24. The golf ball of claim 18, wherein the intermediate layer is comprised of two portions having different colors.

* * * * *

UNITED STATES PATENT AND TRADEMARK OFFICE
CERTIFICATE OF CORRECTION

PATENT NO. : 6,949,595 B2
DATED : September 27, 2005
INVENTOR(S) : Morgan et al.

It is certified that error appears in the above-identified patent and that said Letters Patent is hereby corrected as shown below:

Column 58,
Line 38, delete second occurrence of "polyurea".

Signed and Sealed this

Twenty-seventh Day of December, 2005

JON W. DUDAS
*Director of the United States Patent and Trademark Office*